United States Patent
Han et al.

(10) Patent No.: US 10,044,518 B2
(45) Date of Patent: Aug. 7, 2018

(54) MOBILE TERMINAL AND HOME APPLIANCE

(71) Applicant: LG ELECTRONICS INC, Seoul (KR)

(72) Inventors: Dongwoo Han, Seoul (KR); Heejung Seo, Seoul (KR); Seunghyuck Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/261,309

(22) Filed: Sep. 9, 2016

(65) Prior Publication Data
US 2017/0078109 A1 Mar. 16, 2017

(30) Foreign Application Priority Data
Sep. 11, 2015 (KR) .................. 10-2015-0129288

(51) Int. Cl.
| | | |
|---|---|---|
| *H04M 3/00* | (2006.01) | |
| *H04L 12/28* | (2006.01) | |
| *H04L 29/08* | (2006.01) | |
| *H04W 4/80* | (2018.01) | |
| *H04W 4/00* | (2018.01) | |

(52) U.S. Cl.
CPC ...... *H04L 12/2816* (2013.01); *H04L 12/2803* (2013.01); *H04L 12/2823* (2013.01); *H04L 67/12* (2013.01); *H04W 4/008* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 5,623,834 A | * | 4/1997 | Bahel | F25B 49/005 62/131 |
| 7,296,426 B2 | * | 11/2007 | Butler | F24F 11/0009 126/116 A |
| 2002/0082924 A1 | * | 6/2002 | Koether | G06Q 10/06 705/15 |
| 2008/0015881 A1 | * | 1/2008 | Shankar | G06Q 30/016 455/556.1 |
| 2008/0313007 A1 | * | 12/2008 | Callahan | G06Q 10/06311 705/7.13 |
| 2009/0256617 A1 | * | 10/2009 | Ochi | H03F 3/2173 327/333 |

(Continued)

FOREIGN PATENT DOCUMENTS

| | | |
|---|---|---|
| EP | 2648393 A1 | 10/2013 |
| KR | 10-2009-0114309 A | 11/2009 |

(Continued)

*Primary Examiner* — Shantell L Heiber
(74) *Attorney, Agent, or Firm* — Dentons US LLP

(57) ABSTRACT

A mobile terminal includes a communication unit, a microphone, a display, and a controller to transmit a request for transmitting diagnostic data to a home appliance through the communication unit, to extract diagnostic data of the home appliance from sound received from the home appliance through the microphone, and to transmit a diagnostic data image, acquired by imaging the diagnostic data, to a server. Thereby, the mobile terminal may conveniently transmit the diagnostic data image based on the diagnostic data of the home appliance to the server.

6 Claims, 22 Drawing Sheets

(56) References Cited

U.S. PATENT DOCUMENTS

| | | | |
|---|---|---|---|
| 2012/0051187 A1 | 3/2012 | Paulson | |
| 2013/0159200 A1* | 6/2013 | Paul | G06Q 30/012 |
| | | | 705/305 |
| 2014/0300447 A1* | 10/2014 | Ha | H04Q 9/00 |
| | | | 340/5.61 |
| 2015/0204561 A1* | 7/2015 | Sadwick | F24F 11/006 |
| | | | 236/1 C |
| 2015/0280784 A1* | 10/2015 | Fornage | H04B 3/544 |
| | | | 375/257 |

FOREIGN PATENT DOCUMENTS

| | | |
|---|---|---|
| KR | 10-2013-0112568 A | 10/2013 |
| KR | 10-2015-0031695 A | 3/2015 |
| WO | 2015/037963 A1 | 3/2015 |

\* cited by examiner

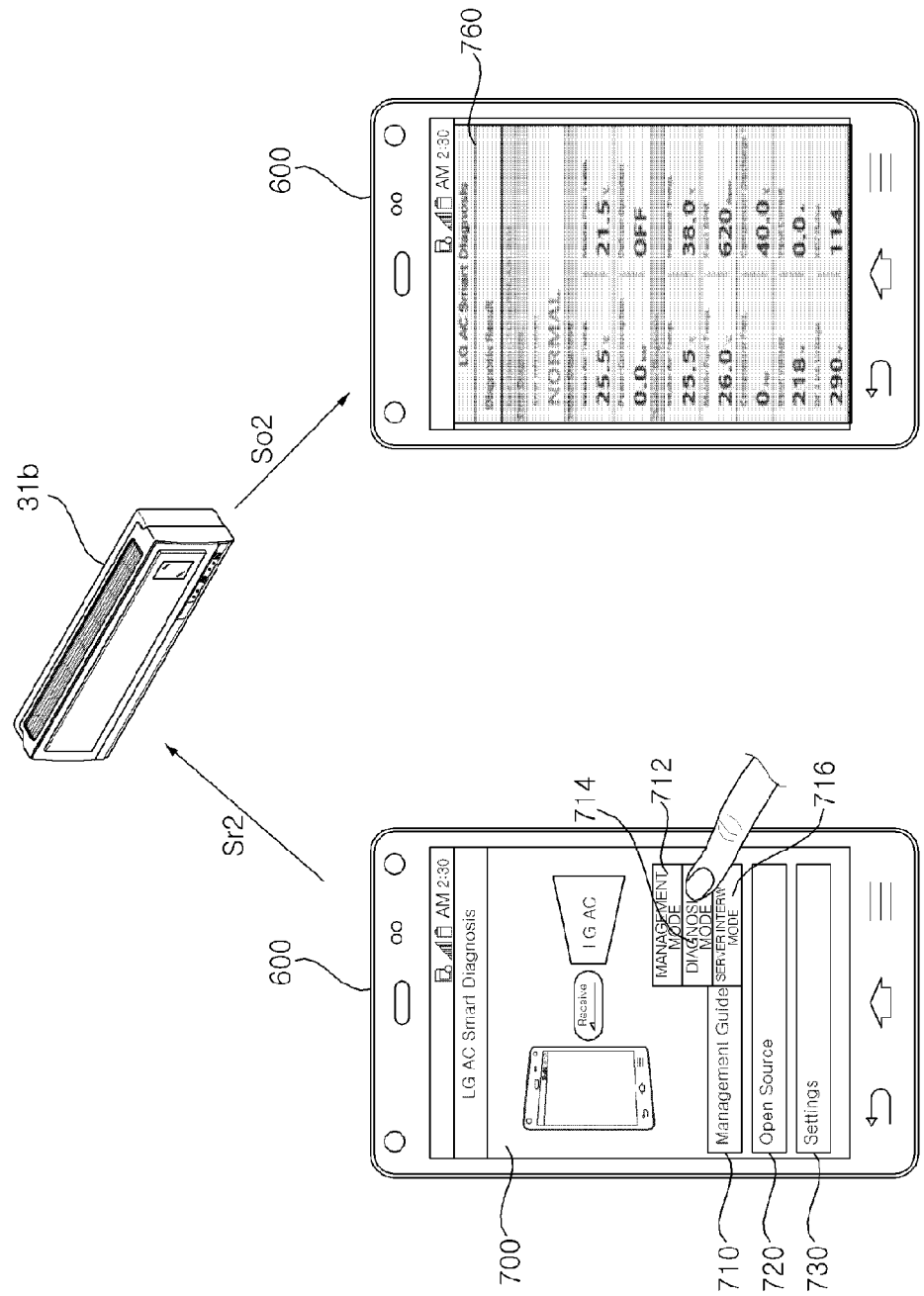

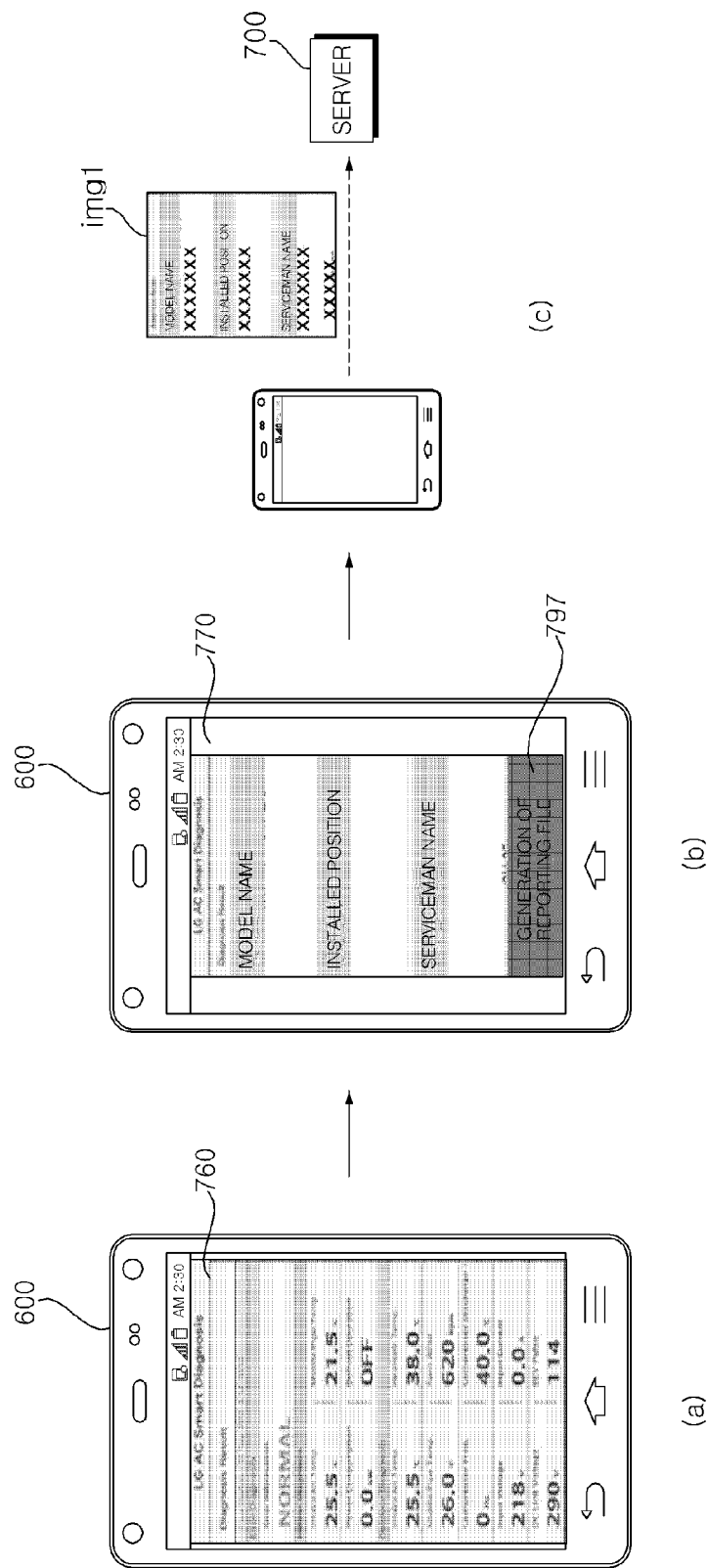

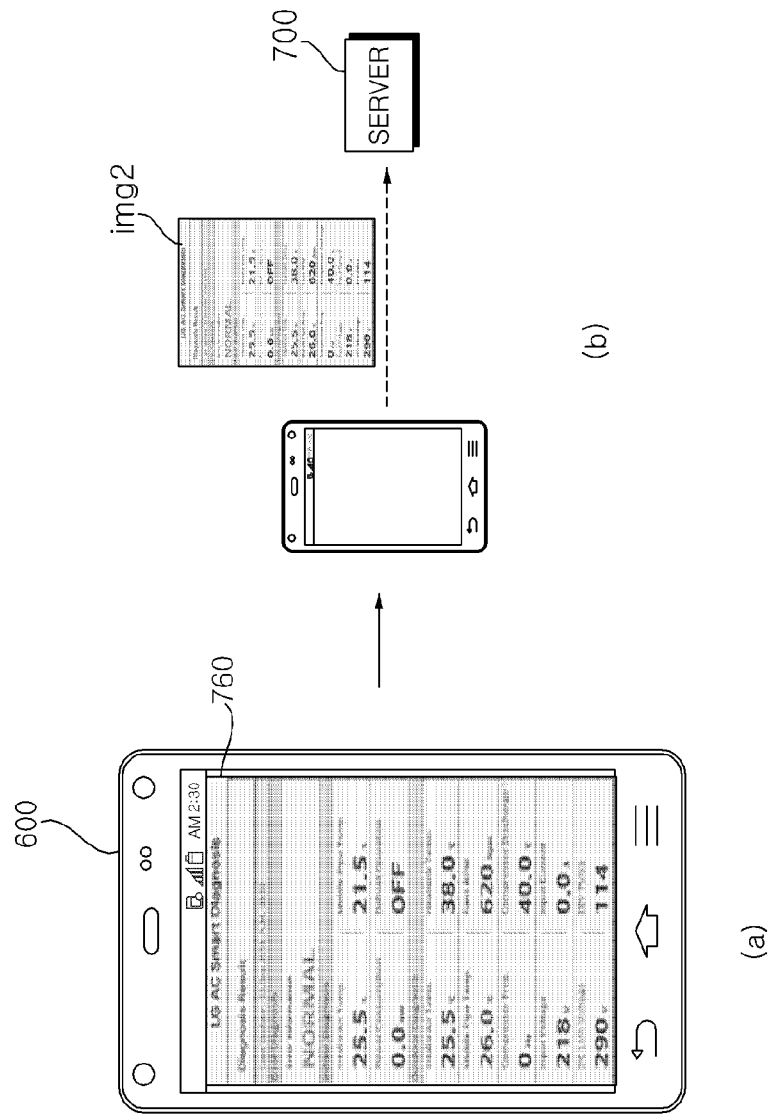

MOBILE TERMINAL AND HOME APPLIANCE

CROSS-REFERENCE TO RELATED APPLICATION

This application claims the benefit of Korean Patent Application No. 10-2015-0129288, filed on Sep. 11, 2015 in the Korean Intellectual Property Office, the disclosure of which is incorporated herein by reference.

BACKGROUND

1. Field of the Disclosure

The present disclosure relates to a mobile terminal and a home appliance and, more particularly, to a mobile terminal, which may simply transmit a diagnostic data image based on diagnostic data of a home appliance to a server, and/or a home appliance.

2. Background

Home appliances, such as a refrigerator, a laundry treatment apparatus, an air conditioner, etc., are disposed in a dwelling and perform corresponding operations.

According to development of various communication methods, various measures to increase user convenience of a home appliance through communication are being researched. Particularly, research into simple performance of fault diagnosis of a home appliance is being carried out.

SUMMARY

One object is to provide a mobile terminal, which may simply transmit a diagnostic data image based on diagnostic data of a home appliance to a server, and a home appliance.

The objects of the present disclosure are not limited to the above-mentioned objects and other objects that have not been mentioned above will become evident to those skilled in the art from the following description.

To achieve the above objects, there is provided a mobile terminal according to an exemplary embodiment of the present invention, including a communication unit, a microphone, a display, and a controller to transmit a request for transmitting diagnostic data to a home appliance through the communication unit, to extract diagnostic data of the home appliance from sound received from the home appliance through the microphone, and to transmit a diagnostic data image, acquired by imaging the diagnostic data, to a server.

To achieve the above objects, there is provided a home appliance according to an exemplary embodiment of the present invention, including a memory to store diagnostic data, a communication unit to exchange data with a mobile terminal, a sound output unit, and a controller, in response to reception of a diagnostic data request through the communication unit, to control the sound output unit to output sound corresponding to the diagnostic data stored in the memory.

BRIEF DESCRIPTION OF THE DRAWINGS

The above and other objects, features and other advantages will be more clearly understood from the following detailed description taken in conjunction with the accompanying drawings, in which:

FIGS. 7A to 10C are reference views to describe the method of FIG. 6;

DETAILED DESCRIPTION OF THE EMBODIMENTS

The advantages and features, and the way of attaining the same, will become apparent with reference to embodiments described below in conjunction with the accompanying drawings. Reference will now be made in detail to the preferred embodiments of the present invention, examples of which are illustrated in the accompanying drawings. Wherever possible, the same reference numbers will be used throughout the drawings to refer to the same or like parts.

The suffixes "module" and "unit" in elements used in description below are only given in consideration of ease in preparation of the specification and do not provide specific meanings or functions. Therefore, the suffixes "module" and "unit" may be used together. The "module" and "unit" are electrical and/or mechanical structures that are well known to those skilled in the art unless described with certain details in the description. Further, "controller" may be a microprocessor, electrical logic circuits, or electrical circuits designed to control certain module or unit, etc.

A home appliance 100 in accordance with embodiments of the present invention may be a laundry treatment apparatus, an air conditioner, a refrigerator, a water purifier, a cleaner, a TV, a vehicle, a robot, a drone, etc.

Figure 1:
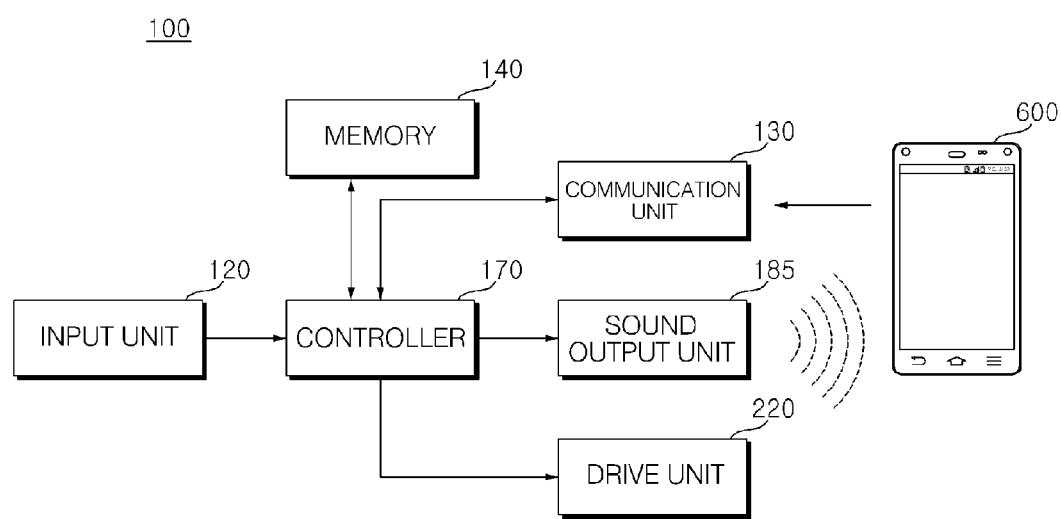
FIG. 1 is an exemplary internal block diagram of a home appliance in accordance with one embodiment of the present invention.

FIG. 1 is an exemplary internal block diagram of a home appliance in accordance with one embodiment of the present invention.

The home appliance 100 may include an input unit 120, a communication unit 130, a memory 140, a controller 170, a sound output unit 185 and a drive unit 220.

In one example, the input unit 120 may include operation buttons, key, etc., and output an input signal for power on/off and operation setup of the home appliance 100.

The communication unit 130 may exchange data with a peripheral device, for example, a remote controller or a mobile terminal 600, by wire or wirelessly. For example, infrared (IR) communication, RF communication, Bluetooth communication, ZigBee communication, Wi-Fi communication, etc., may be performed.

A controller 670 of the mobile terminal 600 (in FIG. 5) may control a home appliance-related picture to be displayed based on user input and, if there is diagnosis mode input under the display state of the home appliance-related picture, transmit a diagnostic data request to the home appliance 100 using, for example, an IR signal, etc.

Thereby, the communication unit 130 of the home appliance 100 may receive the diagnostic data request transmitted in the IR signal and the controller 170 of the home appliance 100 may output sound corresponding to diagnostic data stored in the memory 140 through the sound output unit 185.

A microphone 623 of the mobile terminal 600 may collect the sound output from the sound output unit 185 of the home appliance 100 and transmit the sound to the controller 670.

The controller 670 of the mobile terminal 600 may extract diagnostic data of the home appliance 100 from the sound received from the home appliance 100, transmit a diagnostic data image, acquired by imaging the diagnostic data, to a server 700. Thereby, the diagnostic data image based on the diagnostic data of the home appliance 100 may be conveniently transmitted to the server 700.

The diagnostic data request from the mobile terminal 600 may be transmitted through a wireless communication scheme, for example, an IR signal-based communication scheme.

Data transmission from the home appliance 100 may be executed through a sound output method. Thereby, data may be conveniently transmitted to the mobile terminal 600 using the sound output unit 185 of the home appliance 100.

The memory 140 of the home appliance 100 may store data necessary for operation of the home appliance 100. For example, the memory 140 may store data regarding an operation time, an operation mode, etc., when the drive unit 220 is operated.

Further, the memory 140 of the home appliance 100 may store diagnostic data including operation information, driving information, and error information of the home appliance 100.

The controller 170 may control the respective units in the home appliance 100. For example, the controller 170 may control the input unit 120, the communication unit 130, the memory 140, the drive unit 220, etc.

In accordance with one embodiment of the present invention, the memory 140 of the home appliance 100 may store diagnostic data including, if an error is generated during driving of the home appliance 100, error generation time information, driving information, and state information at the moment of error generation.

The memory 140 may periodically temporarily store driving information and state information and, if an error is generated, store final driving information and final state information out of the driving information and state information which are periodically temporarily stored.

For instance, the memory 140 may store, if an error is generated, driving information at the moment of error generation and driving information or state information after a designated time from the error generation.

The controller 170 of the home appliance 100 may control the memory 140 to store, if an error is generated during driving of the home appliance 100, diagnostic data including error generation time information, driving information, and state information at the moment of error generation, and output, in response to reception of a diagnostic data request by the communication unit 130, sound corresponding to the diagnostic data. Thereby, the diagnostic data may be conveniently transmitted to the mobile terminal 600.

Here, the diagnostic data may include driving information and state information, which are periodically stored, driving information at the moment of error generation, and driving information or state information after a designated time from error generation.

For example, the diagnostic data may include temperature information, compressor discharge temperature information, outdoor fan speed information, indoor fan operation mode information, information as to whether or not an error is generated, etc.

The sound output unit 185 may include a speaker to output sound.

Further, the sound output unit 185 may include a motor 230 within the drive unit 220 and an inverter 420.

For example, the sound output unit 185 may include an inverter 420 (in FIG. 2) including a plurality of switching elements, converting DC power into AC power by switching of the switching elements and supplying the AC power to a motor 230 (in FIG. 4), and the controller 170 may, when sound is outputted, vary a switching frequency of each switching element of the inverter 420 and control sound corresponding to the varied switching frequency to be outputted.

The drive unit 220 may drive the motor 230 of the home appliance 100.

A motor drive device disclosed in the specification may be a sensorless motor drive device which may estimate the position of a rotor of a motor without a position sensor unit to sense the position of the rotor of the motor, such as a Hall sensor. Hereinafter, the sensorless motor drive device will be described.

The motor drive unit 220 in accordance with one embodiment of the present invention may be referred to as a motor drive device 220.

Figure 2:
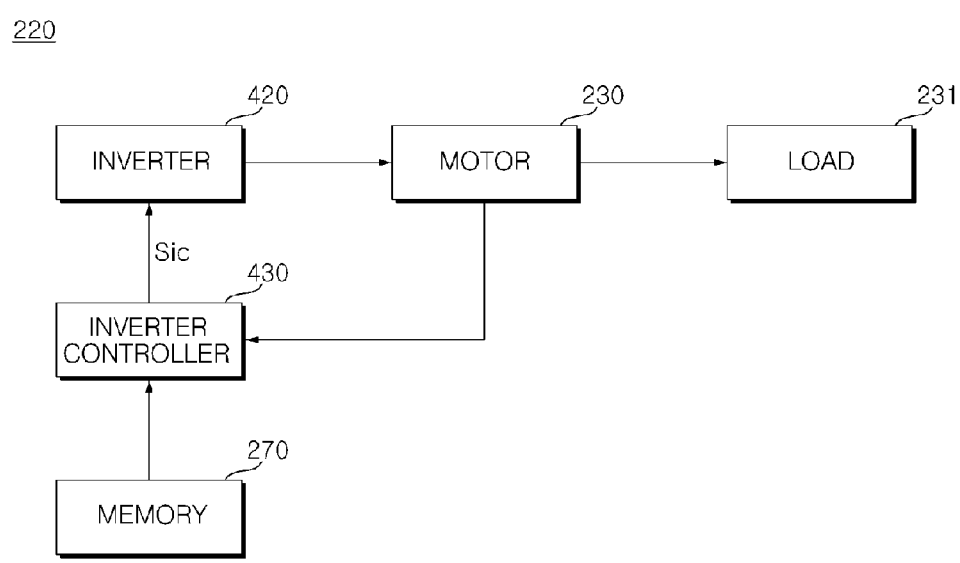
FIG. 2 is an exemplary internal block diagram of a motor drive device of FIG. 1.
Figure 3:
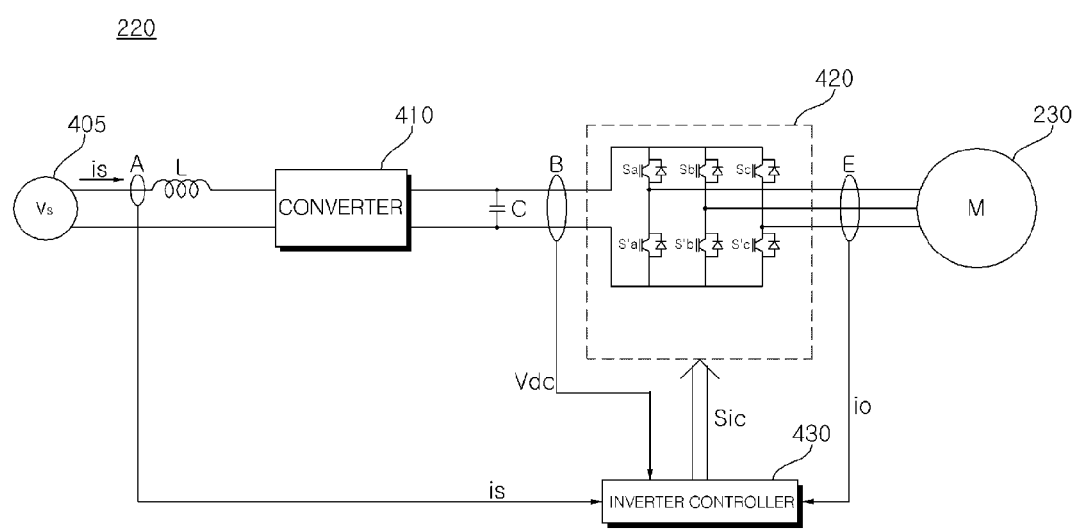
FIG. 3 is an exemplary inner circuit diagram of the motor drive device of FIG. 2.

FIG. 2 is an exemplary internal block diagram of the motor drive device of FIG. 1, and FIG. 3 is an exemplary inner circuit diagram of the motor drive device of FIG. 2.

With reference to FIGS. 2 and 3, the motor drive device 220 in accordance with one embodiment of the present invention serves to drive the motor 230 through a sensorless method and may include the inverter 420 and an inverter controller 430.

Further, the motor drive device 220 in accordance with one embodiment of the present invention may include a converter 410, a DC link voltage detector B, a smoothing capacitor C, and an output current detector E. Further, the motor drive device 220 may further include an input current detector A, a reactor L, etc.

The inverter controller 430 in accordance with one embodiment of the present invention may control the memory 140 or a memory 270 to store, if an error is generated during driving of the home appliance 100, diagnostic data including error generation time information, and driving information and state information at the moment of error generation.

Further, the inverter controller 430 may control the memory 140 or the memory 270 to periodically temporarily store driving information and state information, and control the memory 140 or the memory 270, if an error is generated, to store final driving information and final state information out of the driving information and state information which are periodically temporarily stored.

The inverter controller 430 may control the memory 140 or the memory 270, if an error is generated, to store driving information at the moment of error generation and control the memory 140 or the memory 270 to store driving information or state information after a designated time from error generation.

The data amount of the final driving information or final state information stored in the memory 140 or the memory 270 may be greater than the data amount of the driving information at the moment of error generation or the data amount of the driving information or state information after the designated time from error generation.

Hereinafter, operations of the respective units of the motor driving device 220 of FIGS. 2 and 3 will be described.

The reactor L is disposed between a commercial AC power source ($v_s$) 405 and the converter 410 and performs power factor correction or voltage boosting. Further, the reactor L may perform the function of restricting harmonic currents by high-speed switching of the converter 410.

The input current detector A may detect input current ($i_s$) from the commercial AC power source 405. For this purpose, current transformers (CT), shunt resistors, etc., may be used as the input current detector A. The detected input current ($i_s$) may be inputted as a pulse-type discrete signal to the inverter controller 430.

The converter 410 converts commercial AC power having passed through the reactor L into DC power and outputs the converted DC power. Although the drawings illustrate a single-phase AC power source as the commercial AC power source 405, the commercial AC power source 405 may be a three-phase AC power source. The inner structure of the converter 410 varies according to kinds of the commercial AC power source 405.

Further, the converter 410 may include diodes, etc., without switching elements and thus, perform rectification without separate switching.

For example, if the commercial AC power source 405 is a single-phase AC power source, four diodes may be used as a diode bridge and, if the commercial AC power source 405 is a three-phase AC power source, six diodes may be used as a diode bridge.

Further, a half bridge-type converter, for example, in which two switching elements and four diodes are connected, may be used as the converter 410. In the case of a three-phase AC power source, six switching elements and six diodes may be used.

If the converter 410 includes switching elements, the converter 410 may perform voltage boosting, power factor correction, and DC power conversion by switching of the corresponding switching elements.

The smoothing capacitor C may smooth input power and store the smoothed input power. Although FIG. 3 exemplarily illustrates one smoothing capacitor C, a plurality of smoothing capacitors C may be provided to secure stability of the smoothing capacitors C.

Further, although FIG. 3 exemplarily illustrates the smoothing capacitor C as being connected to the output terminal of the converter 410, the smoothing capacitor C is not limited thereto and DC power may be inputted directly to the smoothing capacitor C. For example, DC power from a solar cell may be inputted directly to the smoothing capacitor C or be subjected to DC/DC conversion and then inputted to the smoothing capacitor C. Hereinafter, parts which are exemplarily illustrated in the drawings will be described.

Since DC power is stored in the smoothing capacitor C and provided at both ends of the smoothing capacitor C, the ends may be referred to as DC ends or DC links.

The DC link voltage detector B may detect voltage (Vdc) at both ends, i.e., DC links, of the smoothing capacitor C.

For this purpose, the DC link voltage detector B may include a resistor, an amplifier, etc. The detected DC link voltage (Vdc) may be inputted as a pulse-type discrete signal to the inverter controller 430.

The inverter 420 may include a plurality of inverter switching elements, converts smoothed DC power (Vdc) into three-phase AC power (va, vb, vc) of a designated frequency by on/off operation of the switching elements, and outputs the converted three-phase AC power (va, vb, vc) to the three-phase synchronous motor 230.

The inverter 420 includes upper arm switching elements Sa, Sb, and Sc and lower arm switching elements S'a, S'b, and S'c, which are respectively connected in series and form pairs, and total three pairs of upper and lower switching elements Sa, Sb, Sc, S'a, S'b, and S'c are connected in parallel. Diodes are connected to the respective switching elements Sa, Sb, Sc, S'a, S'b, and S'c in inverse parallel.

The switching elements Sa, Sb, Sc, S'a, S'b, and S'c in the inverter 420 perform on/off operations based on an inverter switching control signal (Sic) from the inverter controller 430. Thereby, three-phase AC power (va, vb, vc) of a designated frequency may be outputted to the three-phase synchronous motor 230.

The inverter controller 430 may control the switching operation of the inverter 420 based on a sensorless method. For this purpose, the inverter controller 430 may receive output current ($i_o$) detected by the output current detector E.

In order to control the switching operation of the inverter 420, the inverter controller 430 controls the inverter 420 by outputting the inverter switching control signal (Sic). The inverter switching control signal (Sic) is a pulse width modulation (PWM)-type switching control signal and is generated and outputted based on the output current ($i_o$) detected by the output current detector E. A detailed description of output of the inverter switching control signal (Sic) within the inverter controller 430 will be described later with reference to FIG. 3.

The output current detector E detects the output current ($i_o$) flowing between the inverter 420 and the three-phase motor 230. That is, the output current detector E detects current flowing in the motor 230. The output current detector E may detect all output currents (ia, ib, ic) of respective phases or detect output currents of two phases using ternary phase equilibrium.

The output current detector E may be located between the inverter 420 and the motor 230, and use current transformers (CT), shunt resistors, etc., so as to detect current.

If shunt resistors are used, three shunt resistors may be located between the inverter 420 and the synchronous motor 230 or one end of each of the three shunt resistors may be connected to the corresponding one of the three lower arm switching elements S'a, S'b and S'c of the inverter 420. Further, two shunt resistors may be used using ternary phase equilibrium. Further, if one shunt resistor is used, the shunt resistor may be disposed between the above-described capacitor C and the inverter 420.

The detected output current ($i_o$) may be applied as a pulse-type discrete signal to the inverter controller 430, and the inverter switching control signal (Sic) is generated based on the detected output current ($i_o$). Hereinafter, the detected output current ($i_o$) and the output currents (ia, ib, ic) of three phases may be used together.

The three-phase motor 230 includes a stator and a rotor, and the rotor is rotated by applying AC power of the respective phases of designated frequencies to coils of the stator of the respective phases (a, b, c phases).

Such a motor 230 may include, for example, a Surface-Mounted Permanent Magnet Synchronous Motor (SMPMSM), an Interior Permanent Magnet Synchronous Motor (IPMSM), or a Synchronous Reluctance Motor (Synrm). Thereamong, the SMPMSM and the IPMSM are Permanent Magnet Synchronous Motors (PMSM) using permanent magnets and the Synrm does not use permanent magnets.

Figure 4:
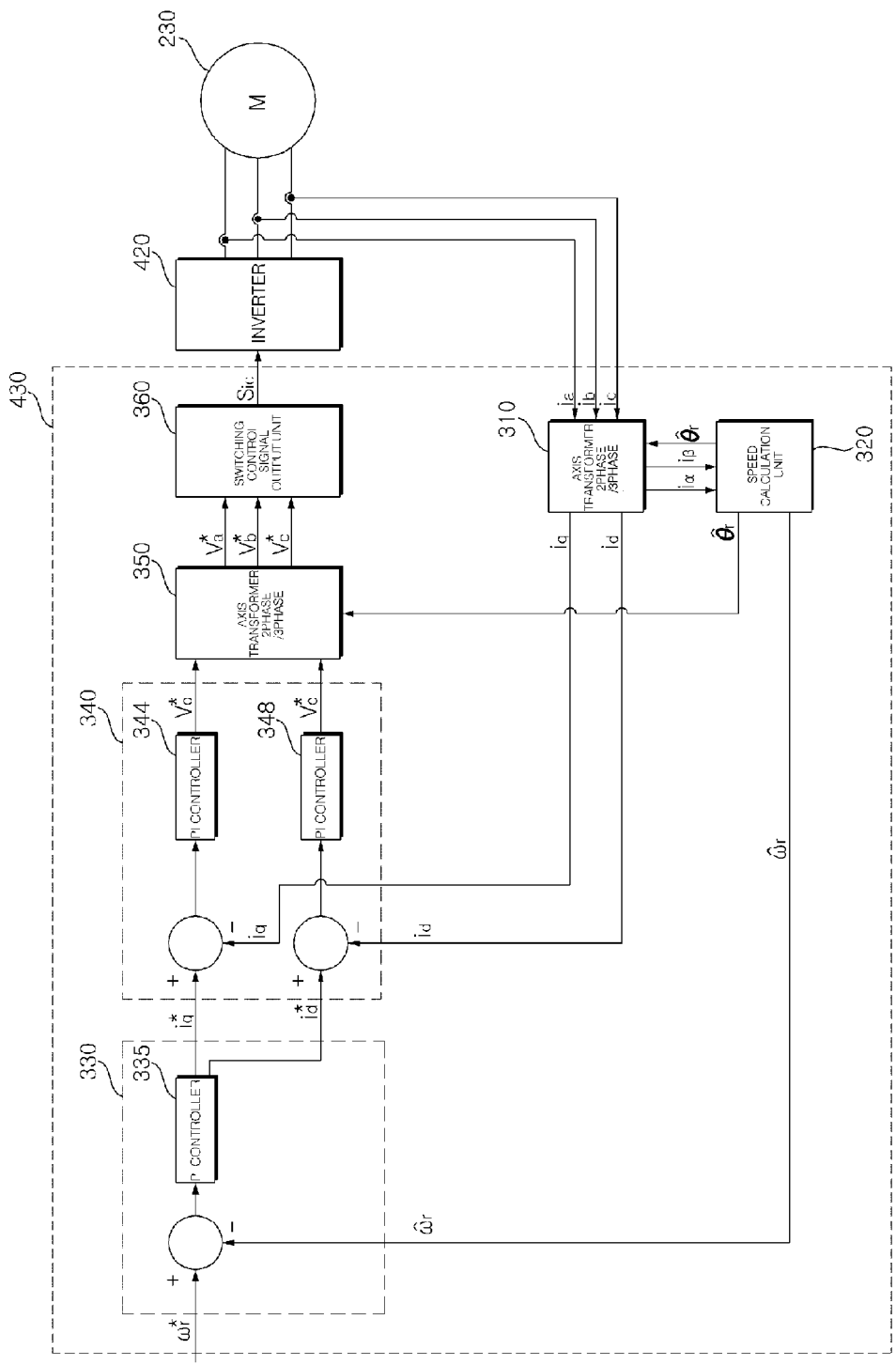
FIG. 4 is an internal block diagram of an inverter controller of FIG. 3.

FIG. 4 is an internal block diagram of the inverter controller of FIG. 3.

With reference to FIG. 4, the inverter controller 430 may include an axis transformer 310, a speed calculation unit 320, a current command generation unit 330, a voltage command generation unit 340, an axis transformer 350, and a switching control signal output unit 360.

The axis transformer 310 receives three-phase output currents (ia, ib, ic) detected by the output current detector E and converts the three-phase output currents (ia, ib, ic) into two-phase currents (iα, iβ) of a stationary coordinate system.

The axis transformer 310 may transform the two-phase currents (iα, iβ) of the stationary coordinate system into two-phase currents ($i_d$, $i_q$) of a rotary coordinate system.

The speed calculation unit 320 may output a position ($\hat{\theta}_r$) and a speed ($\hat{\omega}_r$), calculated based on the converted two-phase currents (iα, iβ) of the stationary coordinate system.

The current command generation unit 330 may generate a current command value ($i^*_q$) based on the calculation speed ($\hat{\omega}_r$) and a speed command value ($\omega^*_r$). For example, the current command generation unit 330 may execute PI control through a PI controller 335 and generate the current command value ($i^*_q$), based on a difference between the calculated speed ($\hat{\omega}_r$) and the speed command value ($\omega^*_r$). Although FIG. 4 exemplarily illustrates a q-axis current command value ($i^*_q$) as the current command value, a d-axis current command value ($i^*_d$) may also be generated differently from FIG. 4. Further, the d-axis current command value ($i^*_d$) may be set to 0.

The current command generation unit 330 may include a limiter (not shown) to limit the level of the current command value ($i^*_q$) so as not to exceed an allowable range.

Next, the voltage command generation unit 340 generates d-axis and q-axis voltage command values ($v^*_d$, $v^*_q$) based on the d-axis and q-axis currents ($i_d$, $i_q$) of the rotary coordinate system, converted by the axis transformer 310, and the current command values ($i^*_d$, $i^*_q$) generated by the current command generation unit 330. For example, the voltage command generation unit 340 may execute PI control through a PI controller 344 and generate the q-axis voltage command value ($v^*_q$), based on a difference between the q-axis current ($i_q$) and the q-axis current command value ($i^*_q$). Further, the voltage command generation unit 340 may execute PI control through a PI controller 348 and generate the d-axis voltage command value ($v^*_d$), based on a difference between the d-axis current ($i_d$) and the d-axis current command value ($i^*_d$). Further, the voltage command generation unit 340 may include limiters (not shown) to limit the levels of the d-axis and q-axis voltage command values ($v^*_d$, $v^*_q$) so as not to exceed allowable ranges.

The generated d-axis and q-axis voltage command values ($v^*_d$, $v^*_q$) are input to the axis transformer 350.

The axis transformer 350 receives the position ($\hat{\theta}_r$) calculated by the speed calculation unit 320 and the d-axis and q-axis voltage command values ($v^*_d$, $v^*_q$) and executes axis transformation.

First, the axis transformer 350 executes conversion of the two-phase rotary coordinate system into the two-phase stationary coordinate system. Here, the position ($\hat{\theta}_r$) calculated by the speed calculation unit 320 may be used.

Further, the axis transformer 350 may execute conversion of the two-phase stationary coordinate system into the three-phase stationary coordinate system. Through such conversion, the axis transformer 350 may output three-phase output voltage command values (v*a, v*b, v*c).

The switching control signal output unit 360 generates and outputs a pulse width modulation (PWM)-type inverter switching control signal (Sic) based on the three-phase output voltage command values (v*a, v*b, v*c).

The output inverter switching control signal (Sic) may be converted into a gate driving signal by a gate driver (not shown) and inputted to gates of the respective switching elements Sa, S'a, Sb, S'b, Sc and S'c of the inverter 420. Thereby, the respective switching elements Sa, S'a, Sb, S'b, Sc and S'c of the inverter 420 perform switching operation.

Figure 5:
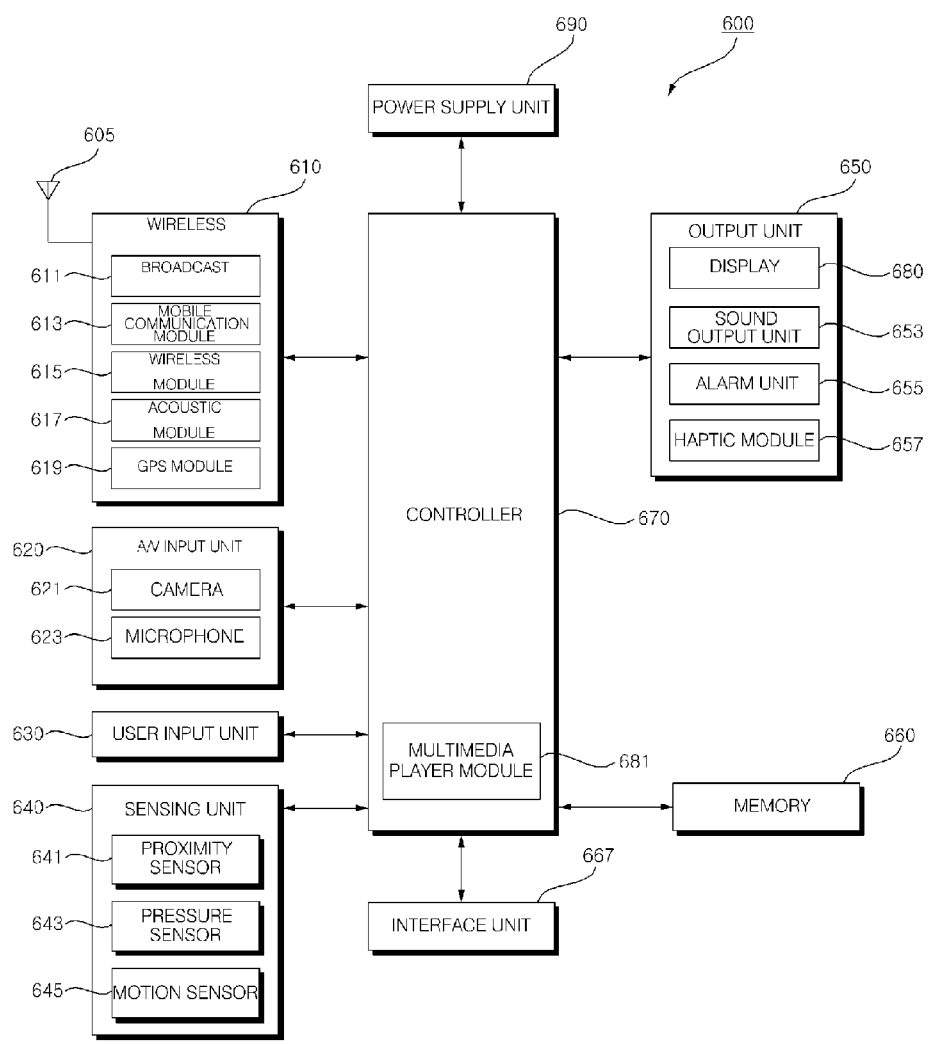
FIG. 5 is an internal block diagram of a mobile terminal of FIG. 1.

FIG. 5 is an internal block diagram of the mobile terminal of FIG. 1.

With reference to FIG. 5, the mobile terminal 600 may include a wireless communication unit 610, an audio/video (A/V) input unit 620, a user input unit 630, a sensing unit 640, an output unit 650, a memory 660, an interface unit 667, a controller 670 and a power supply unit 690.

The wireless communication unit 610 may include a broadcast reception module 611, a mobile communication module 613, a wireless Internet module 615, an acoustic communication unit 617, and a global positioning system (GPS) module 619.

The broadcast reception module 611 may receive at least one of a broadcast signal and broadcast-related information from an external broadcast management server through broadcast channels. Here, the broadcast channels may include satellite broadcast channels, terrestrial broadcast channels, etc.

The broadcast signal and/or broadcast-related information received by the broadcast reception module 611 may be stored in the memory 660.

The mobile communication module 613 receives/transmits a wireless signal from/to at least one of a base station, an external terminal and a server in a mobile communication network. Here, the wireless signal may include a voice call signal, a video call signal, or various types of data according to reception/transmission of text/multimedia messages.

The wireless Internet module 615 means a module for wireless Internet connection and may be installed inside or outside the mobile terminal 600. As one example, the wireless Internet module 615 may perform Wi-Fi-based wireless communication or Wi-Fi Direct-based wireless communication.

The acoustic communication unit 617 may perform acoustic communication. The acoustic communication unit 617 may output sound by adding designated information data to audio data, which will be outputted, in an acoustic communication mode. Further, the acoustic communication unit 617 may extract designated data from sound received from the outside in the acoustic communication mode.

In addition, as near field communication technology, Bluetooth communication, radio frequency identification (RFID) communication, infrared data association (IrDA), ultra wideband (UWB) communication, ZigBee communication, etc., may be used.

The GPS module 619 may receive position information from a plurality of GPS satellites.

The A/V input unit 620 serves to input an audio signal or a video signal and may include a camera 621 and a microphone 623.

The user input unit 630 generates key input data, which a user inputs so as to control operation of the mobile terminal 600. For this purpose, the user input unit 630 may include a keypad, a dome switch, or a touch pad (constant-pressure type/capacitive type). Particularly, if a touch pad and the display 680 form a layered structure, such a structure may be referred to as a touchscreen.

The sensing unit 640 may sense the current state of the mobile terminal 600, including the opened/closed state of the mobile terminal 600, the position of the mobile terminal 600 and whether or not a user contacts the mobile terminal 600, and generate a sensing signal to control operation of the mobile terminal 600.

The sensing unit 640 may include a proximity sensor 641, a pressure sensor 643 and a motion sensor 645. The motion sensor 645 may sense the movement or position of the mobile terminal 600 using an acceleration sensor, a gyro-sensor, or a gravity sensor. Particularly, the gyrosensor serving to sense an angular velocity may sense a direction (an angle) rotated from a reference direction.

The output unit 650 may include a display 680, a sound output unit 653, an alarm unit 655, and a haptic module 657.

The display 680 displays and outputs information processed by the mobile terminal 600.

Further, if the display 680 and a touch pad form a layered structure to constitute a touchscreen, as described above, the display 680 may be used as an input device, through which information generated by user touch may be inputted, as well as an output device.

The sound output unit 653 outputs audio data received from the wireless communication unit 610 or stored in the memory 660. The sound output unit 653 may include a speaker, a buzzer, etc.

The alarm unit 655 outputs a signal to inform of generation of an event. As one example, the alarm unit 655 may output a signal as vibration.

The haptic module 657 may generate various haptic effects which a user may feel. As a representative example of the haptic effects generated by the haptic module 657, there is a vibration effect.

The memory 660 may store programs for processing and control by the controller 670, and execute a function of temporarily storing input or output data (for example, a phone book, a message, a still image, a moving picture, etc.).

The interface unit 667 serves as an interface with all external apparatuses connected to the mobile terminal 600. The interface unit 667 may receive data or power from these external apparatuses and transmit the received data or power to the respective elements of the mobile terminal 600, and transmit data within the mobile terminal 600 to external apparatuses.

The controller 670 may generally control the overall operation of the mobile terminal 600 by controlling the operations of the respective elements. As one example, the controller 670 may perform control and processing regarding voice call, data communication, video call, etc. Further, the controller 670 may include a multimedia player module 681. The multimedia player module 681 may be configured as hardware within the controller 670 or configured as software separately from the controller 670 and executed by the controller 670.

The power supply unit 690 receives external power and internal power under the control of the controller 670 and supplies power necessary to operate the respective elements.

FIG. 5 is a block diagram of the mobile terminal 600 in accordance with one embodiment of the present invention. The respective elements of the block diagram may be unified, added or omitted according to specifications of the mobile terminal 600 as substantially implemented. That is, as needed, two or more elements may be unified into one element, or one element may be segmented into two or more elements. Further, functions performed by respective blocks are only to describe the embodiment of the present invention and detailed operations or devices thereof do not limit the scope of the present invention.

Figure 6:
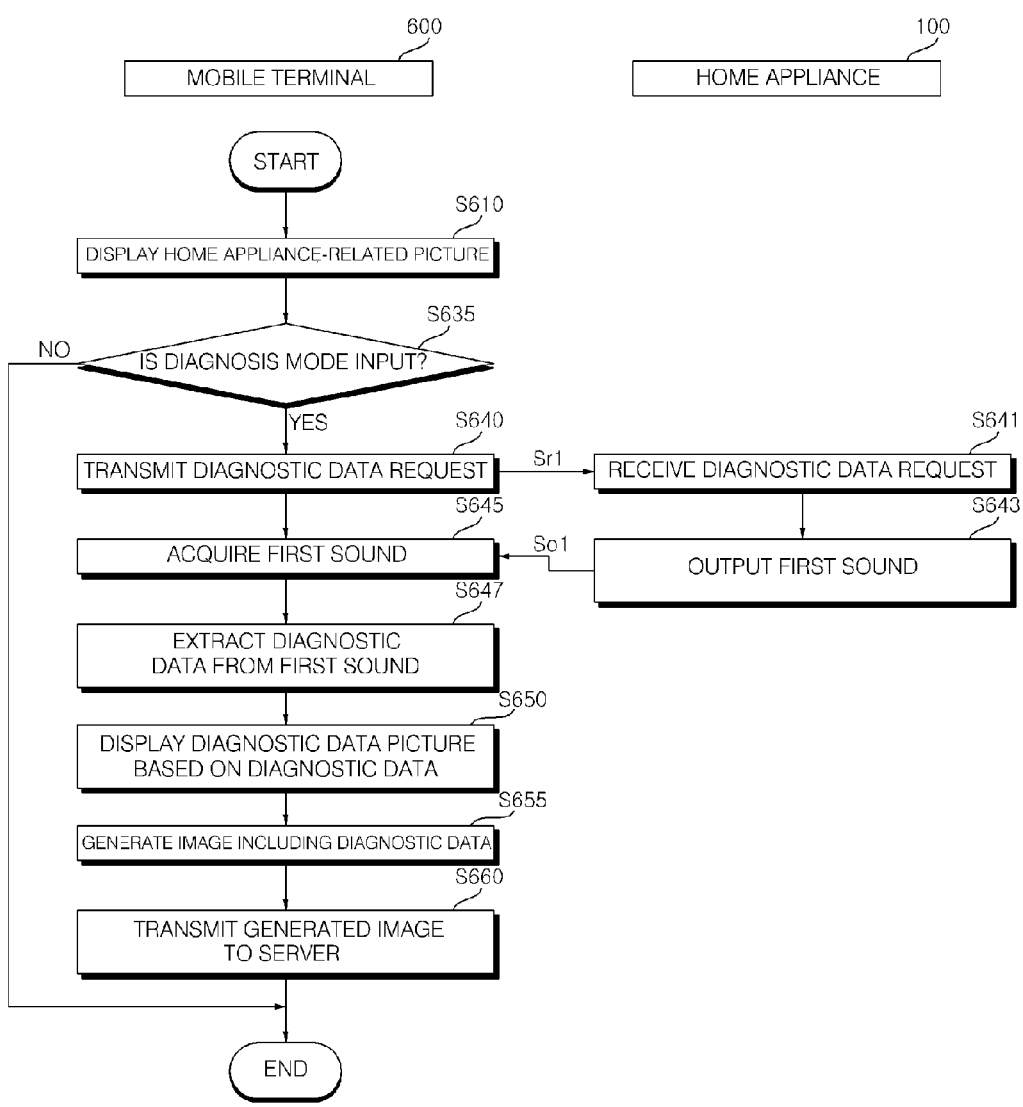
FIG. 6 is a flowchart illustrating a method for operating a mobile terminal and a home appliance in accordance with one embodiment of the present invention.

FIG. 6 is a flowchart illustrating a method for operating a mobile terminal and a home appliance in accordance with one embodiment of the present invention and FIGS. 7A to 10C are reference views to describe the method of FIG. 6.

First, with reference to FIG. 6, the controller 670 of the mobile terminal 600 controls display of a home appliance-related picture based on user input (Operation S610).

For example, if a home application to control a home appliance 100, installed in the mobile terminal 600, is executed, the controller 670 of the mobile terminal 600 may display the home appliance-related picture.

Further, the controller 670 of the mobile terminal 600, if a pairing signal or a pairing response signal is received from the home appliance 100 through the communication unit 610, may display the home appliance-related picture based on user input or automatically after completion of pairing with the home appliance 100.

Thereafter, the controller 670 of the mobile terminal 600, if there is a diagnosis mode input in the display state of the home appliance-related picture (Operation S635), may control the communication unit 610 to transmit a diagnostic data request (Sr2) (Operation S640).

Further, separately from the operation of the mobile terminal 600, the controller 170 of the home appliance 100, if an error is generated, may control the memory 140 to store diagnostic data.

Here, the diagnostic data may include driving information and state information, which are periodically stored, driving information at the moment of error generation, and driving information or state information after a designated time from error generation.

For example, the diagnostic data may include temperature information, compressor discharge temperature information, outdoor fan speed information, indoor fan operation mode information, information as to whether or not an error is generated, etc.

The controller 170 of the home appliance 100 may receive the diagnostic data request (Sr1) from the mobile terminal 600 through the communication unit 130 (Operation S641).

Further, the controller 170 of the home appliance 100 may control the sound output unit 185 to output a first sound corresponding to diagnostic data stored in the memory 140 (Operation S643).

The sound output unit 185 may include a speaker to output sound.

Further, the sound output unit 185 may include the motor of the drive unit 220 and the inverter 420.

For example, the sound output unit 185 may include the inverter 420 (in FIG. 2) including a plurality of switching elements, converting DC power into AC power by switching of the switching elements and supplying the AC power to the motor 230 (in FIG. 4), and the controller 170 may, when sound is outputted, vary a switching frequency of each switching element of the inverter 420 and control sound corresponding to the varied switching frequency to be outputted.

Further, the controller 170 of the home appliance 100 may allocate diagnostic data to respective sounds and output different sounds according to kinds of diagnostic data.

Further, the controller 170 of the home appliance 100 may add diagnostic data to sound, for example, using modulation, and thus output the sound to which the diagnostic data is added.

In this case, the sound output unit 185 may include a frequency transformer 510 (in FIG. 10B) to transform the frequency of sound which will be outputted, a data embedding unit 515 (in FIG. 10B) to embed diagnostic data in an audio signal, the frequency of which has been transformed, an inverse transformer 520 (in FIG. 10B) to execute inverse transformation of the audio signal in which the diagnostic data is embedded, and a multiplexer 525 (in FIG. 10B) to multiplex the inversely transformed audio signal, and the sound output unit 185 may output sound corresponding to the multiplexed audio signal.

The controller 670 of the mobile terminal 600 may acquire a first sound (S01) through the microphone 623 (Operation S645).

Further, the controller 670 of the mobile terminal 600 may extract diagnostic data from the received first sound (Operation S647).

Further, the controller 670 of the mobile terminal 600 displays a diagnostic data picture based on the extracted diagnostic data (Operation S650). Thereby, the diagnostic data of the home appliance 100 may be simply displayed.

The controller 670 of the mobile terminal 600 may generate an image including the home appliance diagnostic data based on user input or automatically (Operation S655) and transmit the generated image to the server 700 (Operation S660).

For example, the controller 670 of the mobile terminal 600, if an image generation item is selected in the display state of the diagnostic data picture, may generate an image including the home appliance diagnostic data. Further, if an item indicating transmission to the server 700 is selected, the controller 670 of the mobile terminal 600 may control the generated image to be transmitted to the server 700.

Here, the image including the home appliance diagnostic data may further include product information of the home appliance 100, installation place information, and installation or diagnostic service provider information, in addition to the home appliance diagnostic data. Here, a diagnostic service provider may be a user of the mobile terminal 600.

For example, if an AS service provider visits a home so as to diagnose the home appliance 100, the home appliance 100 may provide sound corresponding to diagnostic data according to a diagnostic data request from the mobile terminal 600 of the service provider.

Here, the mobile terminal 600 of the service provider may receive the sound, analyze the sound and then output diagnostic data. If there is an input to image the diagnostic data, an image including the diagnostic data, product information of the home appliance 100, installation place information, and installation or diagnostic service provider information may be generated.

Then, the generated image may be transmitted to the server 700. Thereby, accurate diagnostic data may be transmitted to the server 700 and quality of provided services may be improved.

Figure 7A:
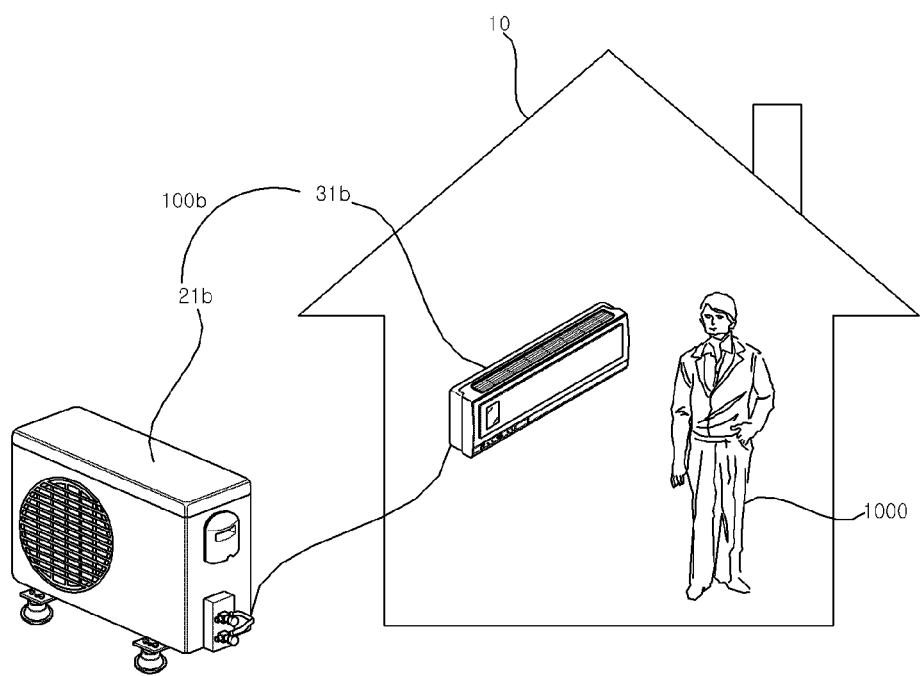

FIG. 7A exemplarily illustrates an air conditioner 100b including an indoor unit 31b and an outdoor unit 21b, as one example of a home appliance.

If an error is generated during driving of a home appliance, such as the air conditioner 100b, various methods to acquire diagnostic data regarding error generation are being discussed.

In the present embodiment, in order to acquire diagnostic data when an error is generated during driving of the home appliance, output of sound from the home appliance to the mobile terminal 600 will be exemplarily described.

The mobile terminal 600 acquires sound from the home appliance, extracts diagnostic data from the sound, and displays a diagnostic data picture on the mobile terminal 600 of a user 1000.

FIG. 7B exemplarily illustrates exchange of data between the indoor unit 31b and the mobile terminal 600 of the user 1000.

For instance, if an application to control the home appliance installed in the mobile terminal 600 is executed, the controller 670 of the mobile terminal 600 may control a home appliance-related picture 700 to be displayed, as exemplarily shown in FIG. 7B.

The home appliance-related picture 700 may include a management item 710, a source item 720 and a setting item 730.

If the management item 710 is selected, the controller 670 of the mobile terminal 600 may display a management mode item 712, a diagnosis mode item 714 and a server interworking item 716 through a pop-up window, as exemplarily shown in FIG. 7B.

If the diagnosis mode item 714 is selected, as exemplarily shown in FIG. 7B, the controller 670 of the mobile terminal 600 may transmit a diagnostic data request (Sr2) to the indoor unit 31b.

A controller 170b of the indoor unit 31b may control sound (So2) corresponding to diagnostic data including driving information, state information, etc., of the outdoor unit 21b and the indoor unit 31b stored in a memory 140b, to be outputted according to reception of the diagnostic data request (Sr2).

Thereby, the controller 670 of the mobile terminal 600 may acquire the sound (So2) through the microphone 623 and extract diagnostic data from the sound (So2).

Further, the controller 670 of the mobile terminal 600 may control a diagnostic data picture 760 to be displayed based on the received diagnostic data of the air conditioner 100b, as exemplarily shown in FIG. 7B.

The diagnostic data picture 760 may include outdoor unit temperature information, compressor discharge temperature information, outdoor fan speed information, indoor fan operation mode information, information as to whether or not an error is generated, etc., of the air conditioner 100b.

The controller 670 of the mobile terminal 600 may autonomously execute smart diagnosis based on the received diagnostic data. For example, the controller 670 of the mobile terminal 600 may judge whether or not a fan of the indoor unit 31b failed based on the received diagnostic data.

Further, in order to execute smart diagnosis, the controller 670 of the mobile terminal 600 may transmit the received diagnostic data to the server 700.

For example, the controller 670 of the mobile terminal 600 may transmit the image including the diagnostic data to the server 700, as described above.

FIG. 7C exemplarily illustrates transmission of the generated diagnostic data-related image to the server 700.

The controller 670 of the mobile terminal 600, if an image generation item is selected by a user in the display state of the diagnostic data picture 760, may display an image generation picture 770, as exemplarily shown in (b) of FIG. 7C.

The diagnostic data-related image generation picture 770 may include items to input product information of the home appliance 100, installation place information, and installation or diagnostic service provider information.

If text input is executed in the diagnostic data-related image generation picture 770, the controller 670 of the mobile terminal 600 may generate an image including the product information of the home appliance 100, the installation place information, and the installation or diagnostic service provider information.

If an image transmission item 797 is selected in the display state of the diagnostic data-related image generation picture 770, the controller 670 of the mobile terminal 600 may transmit a generated image (img1) to the server 700, as exemplarily shown in (c) of FIG. 7C.

Further, in FIG. 7D, if the image transmission item 797 is selected in the display state of the diagnostic data picture 760 after completion of generation of a diagnostic data-related image, the controller 670 of the mobile terminal 600 may transmit a generated image (img2) to the server 700.

Thereafter, if the controller 670 of the mobile terminal 600 receives a diagnostic result from the server 700 or autonomously judges a diagnostic result, the controller 670 of the mobile terminal 600 may display diagnostic result information on the display 680. Thereby, the diagnostic result based on the diagnostic data may be conveniently confirmed.

The sound output unit 185 may include the inverter 420 of the drive unit 220 and the motor 230, as described above, and output sound using the inverter 420 and the motor 230. This will be described with reference to FIGS. 8A and 8B.

Figure 8A:
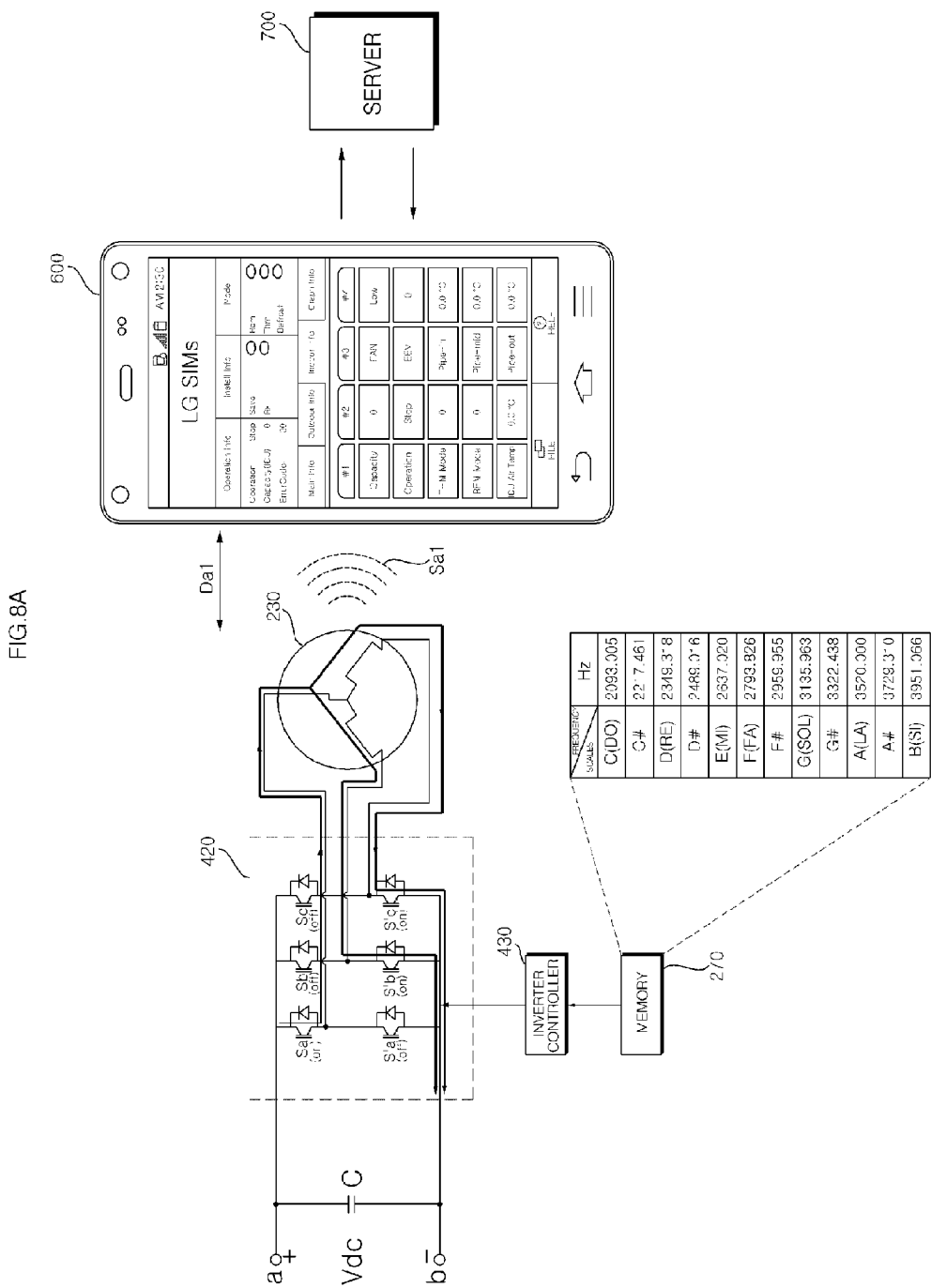
Figure 8B:
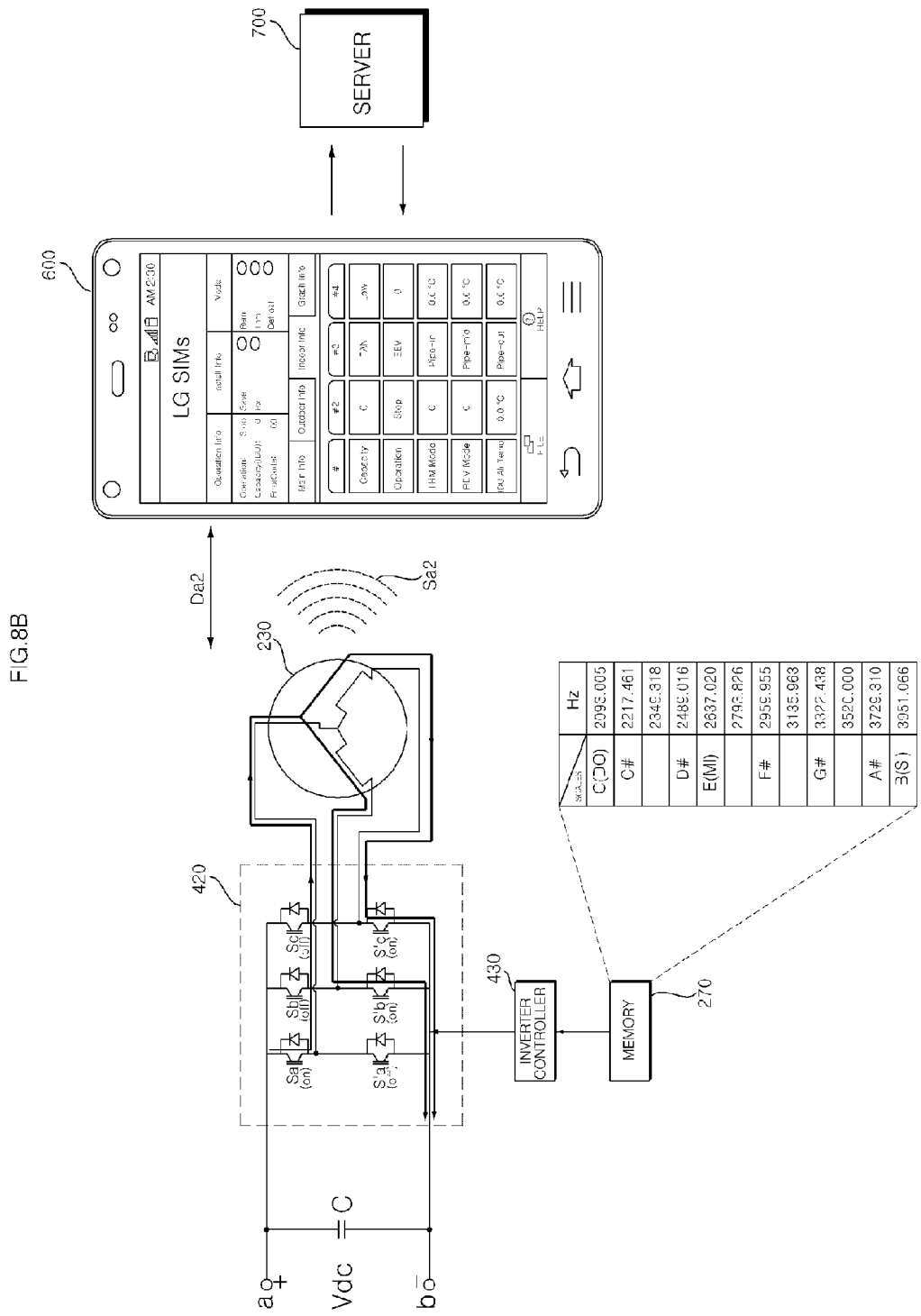

FIG. 8A exemplarily illustrates a case in which the mobile terminal 600 is located at a position spaced by a first distance (Da1) from the motor drive device 220, and FIG. 8B exemplarily illustrates the case in which the mobile terminal 600 is located at a position spaced by a second distance (Da2) longer than the first distance (Da1) from the motor drive device 220.

The inverter controller 430 may calculate the distance between the drive unit 220 and the mobile terminal 600 using an IR signal-based first remote control signal for requesting management data or an IR signal-based second remote control signal for requesting diagnostic data, received through the communication unit 130.

Specifically, the inverter controller 430 may calculate the distance according to the intensity of the first or second remote control signal. For example, as the intensity of the first or second remote control signal decreases, the calculated distance may increase.

It is also possible for the inverter controller 430 to calculate the distance according to the intensity of a remote control signal based on an RF signal (BLE signal, ZigBee signal or Wi-Fi signal) other than the IR signal.

The controller 170 or the inverter controller 430 may vary the volume of the output sound, vary the frequency of the output sound, or vary the output period of the output sound according to the distance from the mobile terminal 600.

Consequently, the controller 170 or the inverter controller 430 may increase the volume of the output sound, lower the frequency of the output sound, or increase the output period of the output sound, as the distance from the mobile terminal 600 increases.

As exemplarily shown in FIGS. 8A and 8B, the inverter controller 430 may output a first sound (Sa1) of a first volume if the mobile terminal 600 is located at a position spaced by the first distance (Da1) from the motor drive device 220, and output a second sound (Sa2) of a second volume greater than the first volume if the mobile terminal 600 is located at a position spaced by the second distance (Da2) longer than the first distance (Da1) from the motor drive device 220.

Otherwise, differently from FIGS. 8A and 8B, the inverter controller 430 may output a first sound (Sa1) of a high frequency if the mobile terminal 600 is located at a position spaced by the first distance (Da1) from the motor drive device 220, and output a second sound (Sa2) of a frequency lower than the frequency of the first sound (Sa1), i.e., sound of a low frequency, which may reach a longer distance, if the mobile terminal 600 is located at a position spaced by the second distance (Da2) longer than the first distance (Da1) from the motor drive device 220.

Otherwise, differently from FIGS. 8A and 8B, the inverter controller 430 may output a first sound (Sa1) for a first period if the mobile terminal 600 is located at a position spaced by the first distance (Da1) from the motor drive device 220, and output a second sound (Sa2) for a second period longer than the first period if the mobile terminal 600 is located at a position spaced by the second distance (Da2) longer than the first distance (Da1) from the motor drive device 220.

The controller 170 or the inverter controller 430 may output sound, the data amount of which varies according to the distance from the mobile terminal 600.

Otherwise, differently from FIGS. 8A and 8B, the controller 170 or the inverter controller 430 may output a first sound (Sa1) corresponding to a first data amount if the mobile terminal 600 is located at a position spaced by the first distance (Da1) from the motor drive device 220, and output a second sound (Sa2) corresponding to a second data amount greater than the first data amount if the mobile terminal 600 is located at a position spaced by the second distance (Da2) longer than the first distance (Da1) from the motor drive device 220.

Although FIGS. 8A and 8B exemplarily illustrate that, in order to output sound, the first upper arm switching element Sa is turned on, the second and third lower arm switching elements S'b and S'c are turned on, the first lower arm switching element S'a is turned off, and the second and third upper arm switching elements Sb and Sc are turned off, various modifications are possible.

In FIGS. 8A and 8B, turning-on of the first upper arm switching element Sa and the second and third lower arm switching elements S'b and S'c, and turning-off of the first lower arm switching element S'a and the second and third upper arm switching elements Sb and Sc so as to output sound may be the same as the operation described in FIG. 3

The inverter controller 430 may vary the turn-on duty of a switching control signal to drive each switching element of the inverter 420 so as to vary the volume of sound. This will be described with reference to FIGS. 9A and 9B.

Figure 9A:
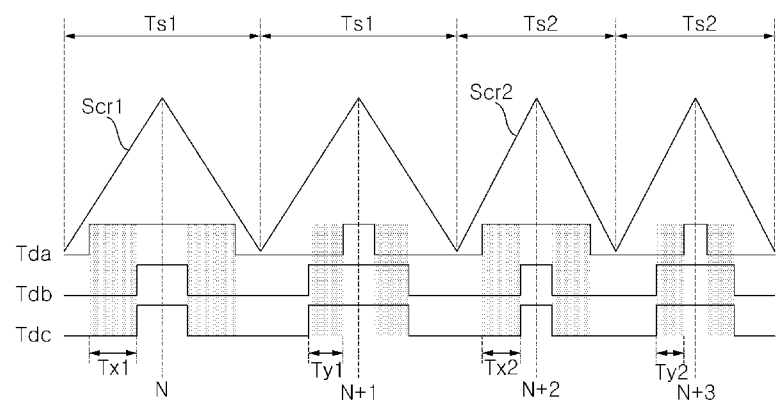
Figure 9B:
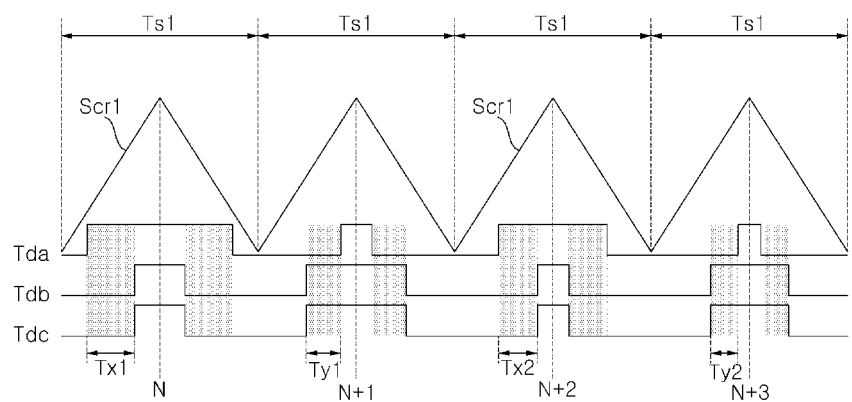

FIGS. 9A and 9B exemplarily illustrate methods for adjusting the volume of sound.

First, FIG. 9A exemplarily illustrates variation of a cycle from Ts1 to Ts2.

In a first Ts1 section, as differences among an a phase turn-on duty (Tda), a b phase turn-on duty (Tdb) and a c phase turn-on duty (Tdc) increase, current in the motor 230 increases and thus, the volume of sound may be increased.

Further, in a second Ts1 section, the a phase turn-on duty (Tda) decreases and the b phase turn-on duty (Tdb) and the c phase turn-on duty (Tdc) increase and thus, current increased in the first Ts1 section may be decreased.

Thereafter, in a first Ts2 section, as a cycle, i.e., a switching frequency, varies, current in the motor 230 increases based on differences among the a phase turn-on duty (Tda), the b phase turn-on duty (Tdb) and the c phase turn-on duty (Tdc), and thus, the volume of sound may be increased.

Thereafter, in a second Ts2 section, the a phase turn-on duty (Tda) decreases and the b phase turn-on duty (Tdb) and the c phase turn-on duty (Tdc) increase and thus, current increased in the first Ts2 section may be decreased.

Next, FIG. 9B exemplarily illustrates a constant cycle of Ts1.

In the first Ts1 section, as differences among the a phase turn-on duty (Tda), the b phase turn-on duty (Tdb) and the c phase turn-on duty (Tdc) increase, current in the motor 230 increases and thus, the volume of sound may be increased.

Further, in the second Ts1 section, the a phase turn-on duty (Tda) decreases and the b phase turn-on duty (Tdb) and the c phase turn-on duty (Tdc) increase and thus, current increased in the first Ts1 section may be decreased.

Thereafter, in the next first Ts1 section, as a cycle, i.e., a switching frequency, varies, current in the motor 230 increases based on differences among the a phase turn-on duty (Tda), the b phase turn-on duty (Tdb) and the c phase turn-on duty (Tdc) and thus, the volume of sound may be increased.

Thereafter, in the next second Ts1 section, the a phase turn-on duty (Tda) decreases and the b phase turn-on duty (Tdb) and the c phase turn-on duty (Tdc) increase and thus, current increased in the first Ts1 section may be decreased.

If data match various sounds in a second mode, the inverter controller 430 may control a corresponding sound to be outputted, as described above.

Differently, the inverter controller 430 may control sound, to which diagnostic data is added, to be outputted. That is, data may be added to an acoustic signal, i.e., sound, through modulation using the sound as a carrier. This will be described with reference to FIGS. 10A to 10C.

Figure 10A:
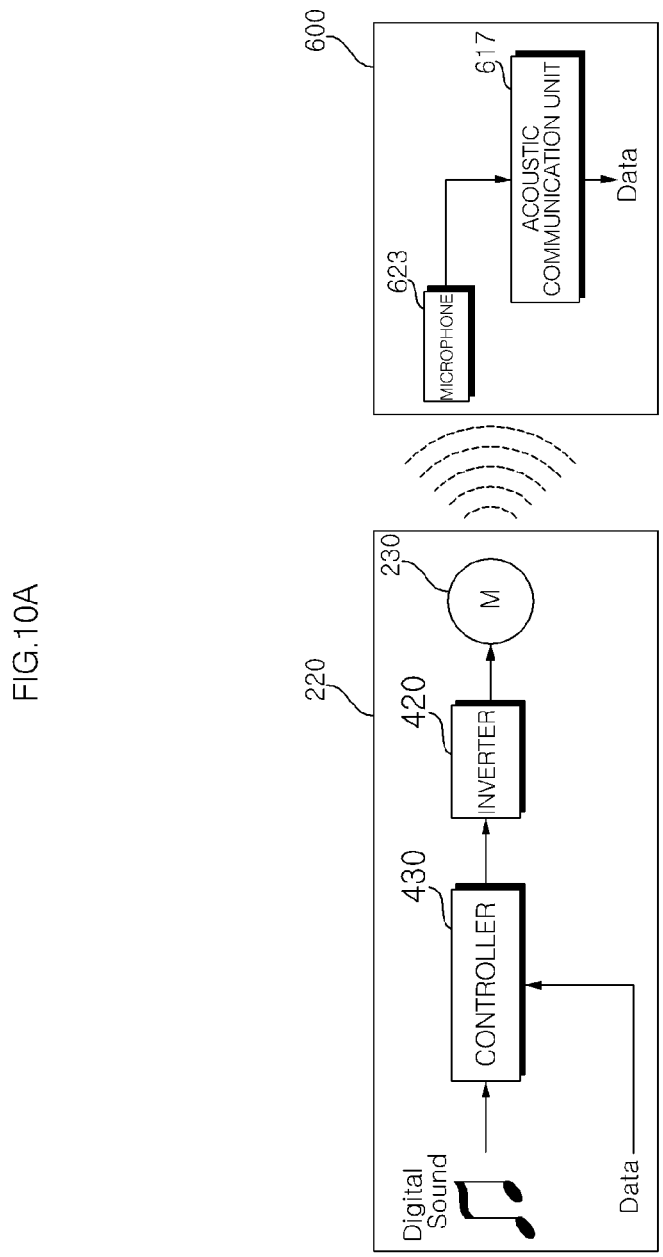
Figure 10B:
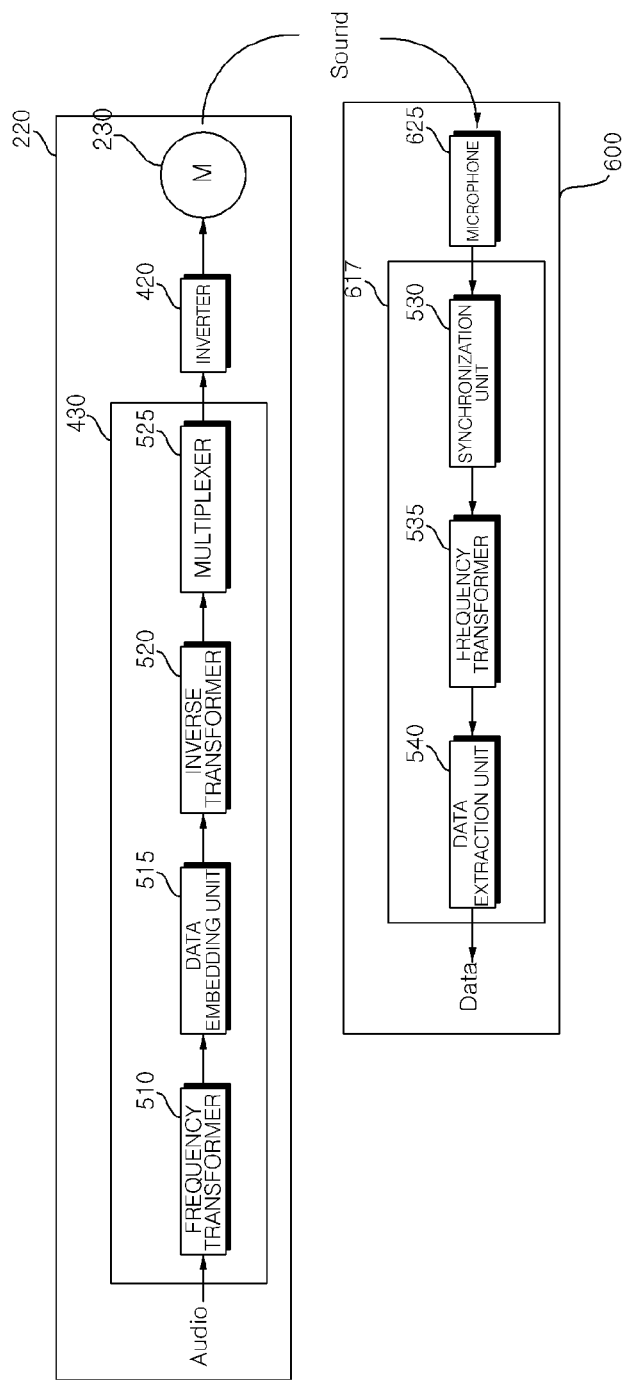
Figure 10C:
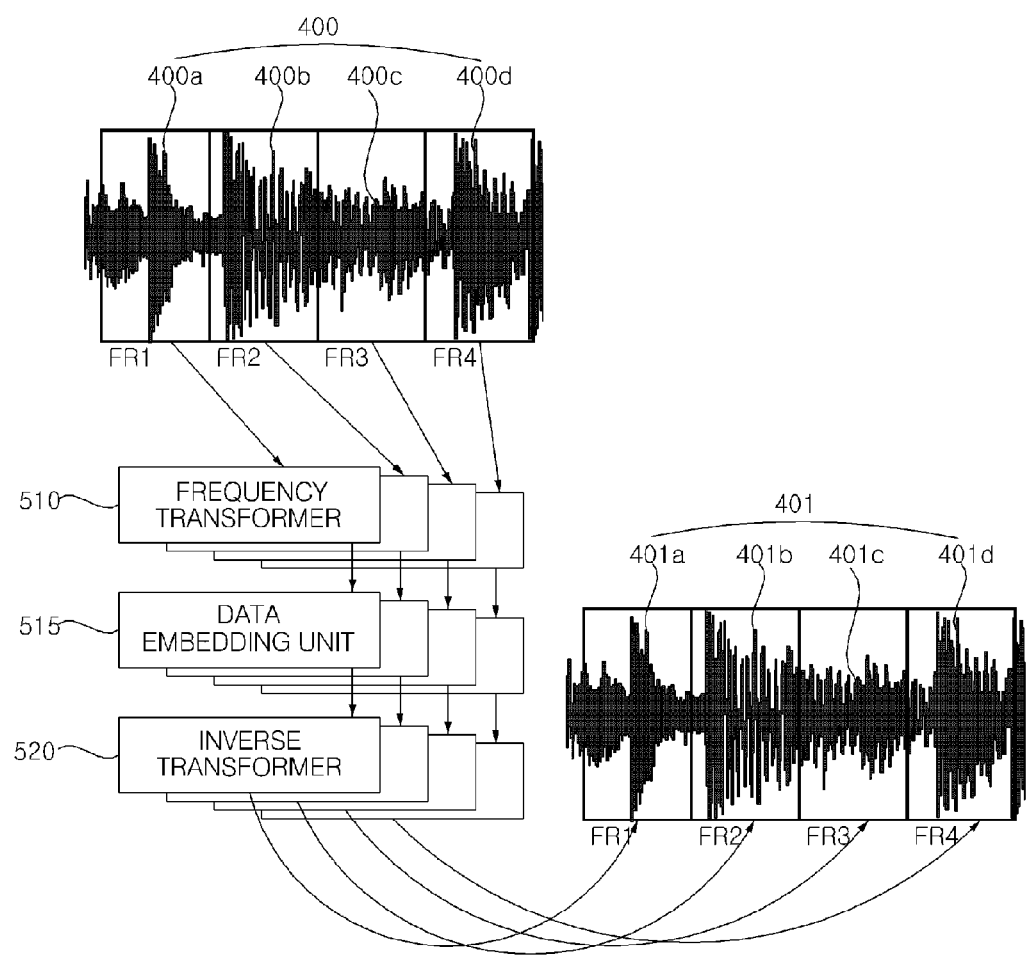

FIGS. 10A to 10C are reference views to describe one example of acoustic communication.

First, FIG. 10A exemplarily illustrates that the motor drive device 220 of the home appliance 100 outputs sound according to acoustic communication and the mobile terminal 600 receives the corresponding sound.

For this purpose, the motor drive device 220 may include the inverter controller 430, the inverter 420 and the motor 230.

The inverter controller 430 of the motor drive device 220 receives an audio signal, i.e., a digital sound, which will be outputted, from the controller 170 and adds designated data to the audio sound.

Further, the inverter controller 430 varies a switching frequency of the inverter 420 so as to output the audio sound to which the designated data is added. Thereby, the sound to which the designated data is added may be outputted through the motor 230.

The microphone 623 of the mobile terminal 600 receives the sound output from the motor drive device 200. Then, the received sound signal is transmitted to the acoustic communication unit 617. The acoustic communication unit 617 extracts data from the sound signal.

Thereby, simple information data exchange between the motor drive device 220 and the mobile terminal 600 may be executed.

Further, contrary to FIG. 10A, the mobile terminal 600 may output sound according to acoustic communication and the motor drive device 220 may receive the corresponding sound.

FIG. 10B exemplarily illustrates an internal block diagram of the inverter controller 430 of the motor drive device 220 and an internal block diagram of the acoustic communication unit 617 of the mobile terminal 600.

In order to output sound, the inverter controller 430 of the motor drive device 220 may include the frequency transformer 510, the data embedding unit 515, the inverse transformer 520, and the multiplexer 525.

The frequency transformer 510 may receive a time-based audio signal, which will be outputted, and execute frequency transformation. Here, the frequency transformation may be executed according to frames and, as an example, be frequency transformed based on modulated complex lapped transform (MCLT).

MCLT is advantageous in that, according to overlapping characteristics of respective frames, blocking artifacts at frame interfaces may be reduced.

The data embedding unit 515 adds or embeds designated data to or in the audio signal, the frequency of which has been transformed. That is, the data embedding unit 515 adds data to the audio signal through modulation. In more detail, data may be added to the audio signal by varying phase coefficients, among coefficients (size and phase coefficients, etc.) of the respective converted frequencies. For example, the varied phase coefficient may have a value of 0 or 180 degrees. Thereby, the added data is distinguishable.

The inverse transformer 520 executes inverse transformation of the audio signal in which the diagnostic data is embedded. If the frequency transformer 510 executes MCLT, the inverse transformer 520 executes inverse MCLT and outputs a time-based sound signal.

The frequency transformer 510, the data embedding unit 515, and the inverse transformer 520 may perform corresponding operations according to frames.

The multiplexer 525 multiplexes the inversely transformed audio signal and outputs the multiplexed audio signal. That is, the multiplexer 525 multiplexes a plurality of frames.

Further, the inverter controller 430 varies the switching frequency of the inverter 420 so as to output multiplexed sound. Thereby, the motor 230 may output the multiplexed sound.

The mobile terminal 600 receives sound through the microphone 623 and converts the received sound into an electrical signal. Further, the acoustic communication unit 617 of the mobile terminal 600 may include a synchronization unit 530, a frequency transformer 535, and a data extraction unit 540 so as to extract data from the received sound.

The synchronization unit 530 synchronizes the received audio signal. That is, the synchronization unit 530 may synchronize the multiplexed audio signal and thus, separate the multiplexed audio signal into frames.

The frequency transformer 535 may receive the time-based audio signal, which will be outputted, and execute frequency transformation. Here, the frequency transformation may be executed according to frames and, as an example, be frequency transformed based on modulated complex lapped transform (MCLT).

The data extraction unit 540 extracts added data from the audio signal, the frequency of which has been transformed. Since the data is added to the audio signal by varying phase coefficients, among coefficients of the respective frequencies, as described above, the data extraction unit 540 may extract the data from the phase coefficients. For instance, if the phase coefficient may have a value of 0 or 180 degrees, the data extraction unit 540 may extract the data from the phase coefficient based on such a value of the phase coefficient.

The extracted data may be transmitted to the controller 670 of the mobile terminal 600.

According to such an MCLT-based acoustic communication method, data may be added to an audio signal while maintaining sound similar to an audio signal originally desired to be outputted. Further, the MCLT-based acoustic communication method is advantageous in that, according to overlapping characteristics of respective frames, blocking artifacts at frame interfaces may be reduced.

FIG. 10C is a view illustrating operation of the inverter controller 430 of FIG. 10B together with audio waveforms.

FIG. 10C exemplarily illustrates an audio signal 400, which will be outputted, and the audio signal 400 may be divided into a plurality of frames FR1 to FR4 based on time. FIG. 10C exemplarily illustrates a first audio signal 400a in a first frame section FR1, a second audio signal 400b in a second frame section FR2, a third audio signal 400c in a third frame section FR3, and a fourth audio signal 400d in a fourth frame section FR4.

The frequency transformer 510 executes frequency transformation of audio data according to the respective frames. In more detail, the frequency transformer 510 executes frequency transformation based on MCLT.

Further, the data embedding unit 515 adds designated data to the audio signal, the frequency of which has been transformed, according to the respective frames. In more detail, the data embedding unit 515 adds the data to the audio signal by varying phase coefficients, among coefficients (size and phase coefficients, etc.) of the respective converted frequencies.

The inverse transformer 520 executes inverse transformation of the audio signal to which the information data is added, according to the respective frames. Thereby, a time-based sound signal is outputted.

FIG. 10C exemplarily illustrates first to fourth sound signals 401a to 401d similar to the first to fourth audio signals 400a to 400d. It may be understood from FIG. 10C that the first to fourth sound signals 401a to 401d are similar to the respective audio signals 400a to 400d originally desired to be outputted.

The multiplexer 525 may multiplex the sound signal to which the data is added, according to the respective frames.

The above-described operation method for outputting the sound of diagnostic data between the mobile terminal 600 and the home appliance 100 and transmitting a diagnostic data image based on output of the sound may be applied to various home appliances. For example, such an operation method may be applied to a laundry treatment apparatus, an air conditioner, a refrigerator, a water purifier, a cleaner, a TV, a vehicle, a robot, a drone, etc.

Figure 11:
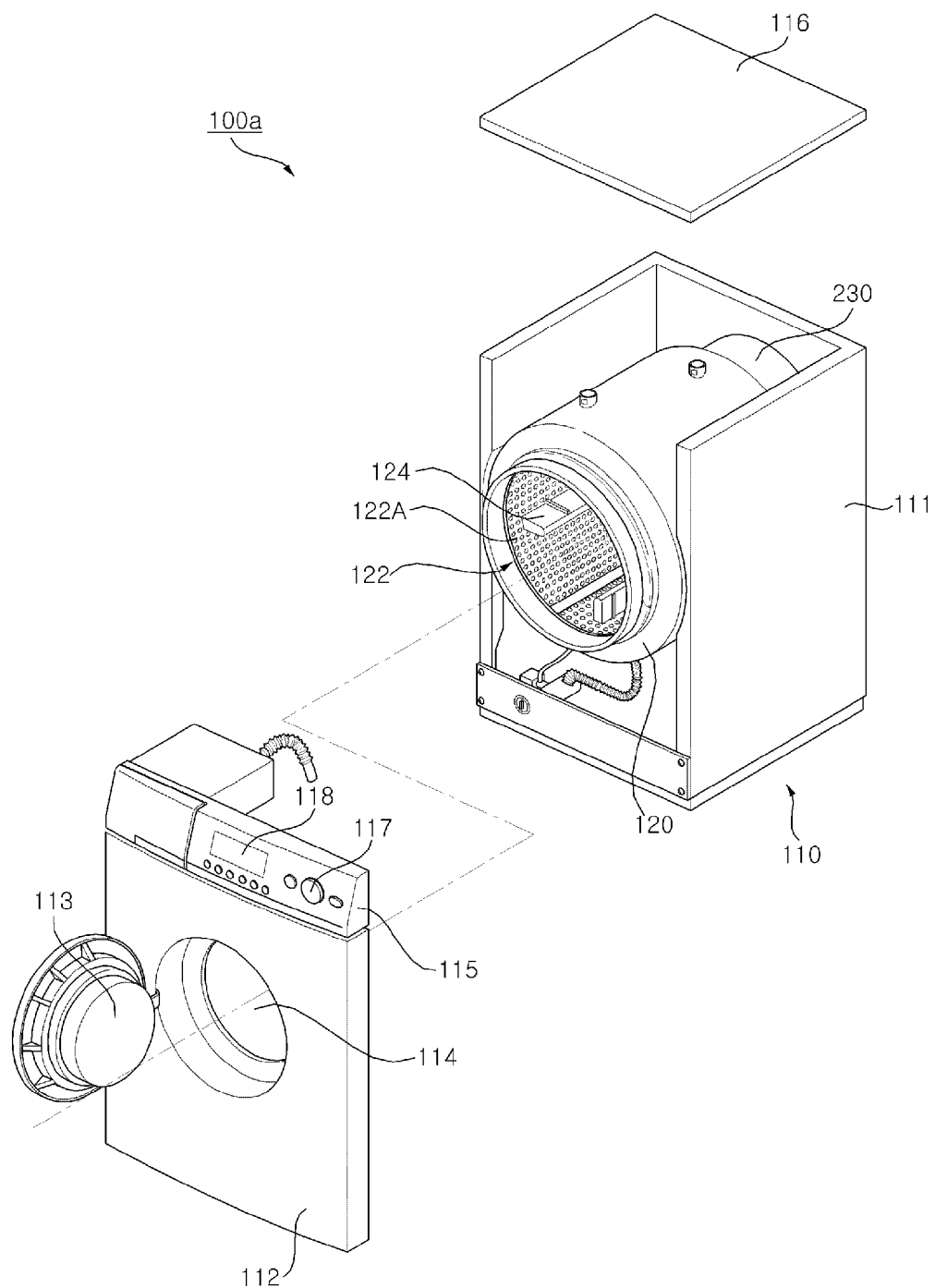
FIG. 11 is a perspective view illustrating a laundry treatment apparatus as one example of a home appliance in accordance with one embodiment of the present invention.

FIG. 11 is a perspective view illustrating a laundry treatment apparatus in accordance with one embodiment of the present invention.

With reference to FIG. 11, a laundry treatment apparatus 100a in accordance with this embodiment of the present invention is a front load-type laundry treatment apparatus in which laundry is put into a drum in the forward direction. Such a front load-type laundry treatment apparatus may include a washing machine into which laundry is put so as to be washed, rinsed and dried, or a drying machine into which wet laundry is put so as to be dried. Hereinafter, a washing machine will be described as the laundry treatment apparatus 100a.

The laundry treatment apparatus 100a of FIG. 11 is a drum-type laundry treatment apparatus and may include a cabinet 110 forming the external appearance of the laundry treatment apparatus 100a, a tub 120 disposed within the cabinet 110 and supported by the cabinet 110, a drum 122 disposed within the tub 120 to wash laundry received in the drum 122, a motor 130 to drive the drum 122, a washing water supply device (not shown) disposed at the outside of a cabinet main body 111 to supply washing water to the inside of the cabinet 110, and a drain device (not shown) disposed under the tub 120 to discharge the washing water to the outside of the cabinet 110.

A plurality of through holes 122A may be formed on the drum 122 so as to pass washing water, and lifters 124 may be disposed on the inner circumferential surface of the drum 122 so as to lift laundry to a designated height and then to drop the laundry by gravity during rotation of the drum 122.

The cabinet 110 includes the cabinet main body 111, a cabinet cover 112 disposed on the front surface of the cabinet main body 111 and coupled with the cabinet main body 111, a control panel 115 disposed on the cabinet cover 112 and coupled with the cabinet main body 111, and a top plate 116 disposed on the control panel 115 and coupled with the cabinet main body 111.

The cabinet cover 112 may include a laundry entrance 114, through which laundry is put into the washing machine 110a, and a door 113 disposed so as to be rotatable from side to side to open and close the laundry entrance 114.

The control panel 115 includes operation keys 117 to manipulate the operating state of the laundry treatment apparatus 100a and a display 118 disposed at one side of the operation keys 117 and displaying the operating state of the laundry treatment apparatus 100a.

The operation keys 117 and the display 118 of the control panel 115 are electrically connected to a controller (not shown) and the controller (not shown) electrically controls the respective elements of the washing treatment apparatus 100a. Operation of the controller (not shown) will be described later.

An auto balancer (not shown) may be provided in the drum 122. The auto balancer (not shown) serves to reduce vibration generated according to an amount of eccentricity of laundry received in the drum 122 and may be a liquid balancer or a ball balancer.

Although not shown in the drawings, the washing treatment apparatus 100a may further include a vibration sensor to measure the degree of vibration of the drum 122 or the degree of vibration of the cabinet 110.

Figure 12:
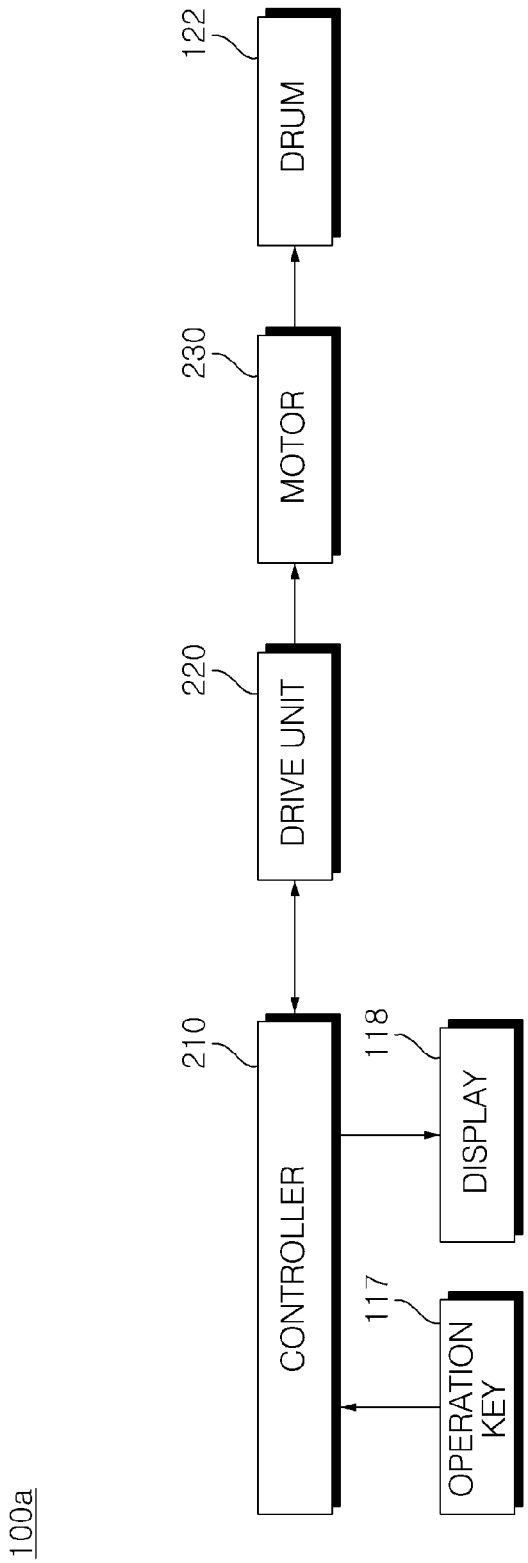
FIG. 12 is an internal block diagram of the laundry treatment apparatus of FIG. 11.

FIG. 12 is an internal block diagram of the laundry treatment apparatus of FIG. 11.

With reference to FIG. 12, in the laundry treatment apparatus 100a, a drive unit 220 is controlled by the control operation of a controller 210 and then drives a motor 230. Thereby, the drum 122 is rotated by the motor 230.

The controller 210 receives an operation signal inputted through the operation keys 117 and is operated. Thereby, washing, rinsing and spin-drying may be performed.

Further, the controller 210 may control the display 118 to display the current operating state of the laundry treatment apparatus 100a, such as a washing course, a washing time, a spin-drying time, a rinsing time, etc.

The controller 210 controls the drive unit 220 to operate the motor 230. Here, a position sensing unit to sense the position of a rotor of the motor 230 is not provided at the inside or the outside of the motor 230. That is, the drive unit 220 controls the motor 230 based on the sensorless method.

The drive unit 220 serves to drive the motor 230, and may include an inverter (not shown), an inverter controller (not shown), an output current detector E (in FIG. 3) to detect output current flowing in the motor 230, and an output voltage detector F (in FIG. 3) to detect output voltage ($v_o$)

applied to the motor 230. Further, the drive unit 220 may further include a converter to supply DC power input to the inverter (not shown).

For example, the inverter controller 430 (in FIG. 3) in the drive unit 220 estimates the position of the rotor of the motor 230 based on output current ($i_o$) and output voltage ($v_o$). Further, the inverter controller 430 (in FIG. 3) controls the motor 230 to be rotated based on the estimated position of the rotor.

In more detail, when the inverter controller 430 (in FIG. 3) generates a PWM-type switching control signal (Sic in FIG. 3) based on output current ($i_o$) and output voltage ($v_o$) and outputs the switching control signal to the inverter (not shown), the inverter (not shown) performs high-speed switching and thus, supplies AC power of a designated frequency to the motor 230. Then, the motor 230 is rotated by the AC power of the designated frequency.

The drive unit 220 may correspond to the motor drive device 220 of FIG. 1.

The controller 210 may sense an amount of laundry based on output current ($i_o$) flowing in the motor 230. For example, the controller 210 may sense the amount of laundry based on a current value ($i_o$) of the motor 230 during rotation of the drum 122.

For instance, the controller 210 may accurately sense the amount of laundry using resistance and inductance values of a stator of the motor 230, which are measured in the motor alignment section.

Further, the controller 210 may sense an amount of eccentricity of the drum 122, i.e., unbalance (UB) of the drum 122. Such sensing of the amount of eccentricity may be executed based on a ripple component of output current ($i_o$) flowing in the motor 230 or a variation of the rotating speed of the drum 122.

For instance, when the amount of eccentricity of the drum 122 is sensed, the controller 210 may accurately sense the amount of eccentricity using resistance and inductance values of the stator of the motor 230, which are measured in the motor alignment section.

Figure 13:
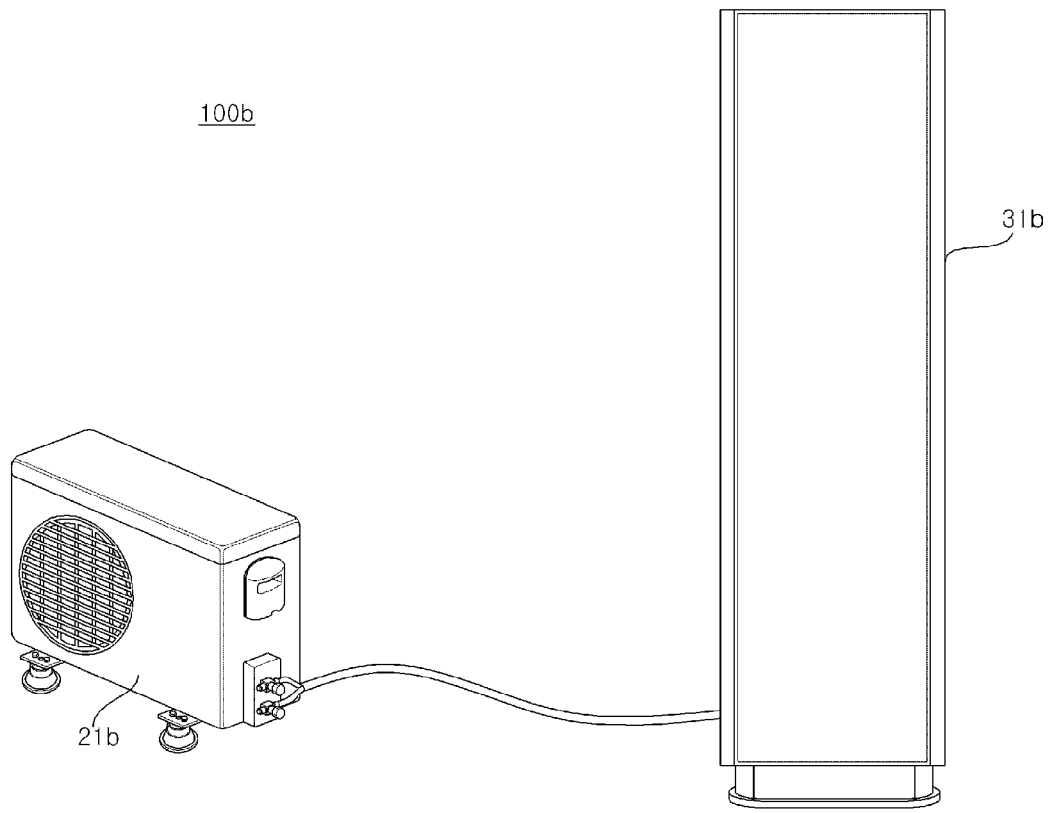
FIG. 13 is a perspective view illustrating an air conditioner as another example of a home appliance in accordance with one embodiment of the present invention.

FIG. 13 is a perspective view illustrating an air conditioner as another example of a home appliance in accordance with one embodiment of the present invention.

An air conditioner 100*b* in accordance with this embodiment of the present invention may include an indoor unit 31*b* and an outdoor unit 21*b* connected to the indoor unit 31*b*, as exemplarily shown in FIG. 13.

The indoor unit 31*b* of the air conditioner 100*b* may be applied to any one of a standing type air conditioner, a wall mounted type air conditioner and a ceiling type air conditioner. FIG. 13 exemplarily illustrates a standing type indoor unit 31*b*.

The air conditioner 100*b* may further include at least one of a ventilation device, an air purification device, a humidification device, and a heater, and the ventilation device, the air purification device, the humidification device, and the heater may be operated while interworking with operation of the indoor unit 31*b* and the outdoor unit 21*b*.

The outdoor unit 21*b* includes a compressor (not shown) which receives a refrigerant and then compresses the refrigerant, an outdoor heat exchanger (not shown) which executes heat exchange between the refrigerant and outdoor air, an accumulator (not shown) which extracts refrigerant in a gaseous state from the supplied refrigerant and supplies the refrigerant in the gaseous state to the compressor, and a four-way valve (not shown) which selects a flow path of the refrigerant according to a heating operation. The outdoor unit 21*b* further includes a plurality of sensors and valves, an oil recovery unit, etc., and a detailed description thereof will be omitted.

The outdoor unit 21*b* compresses the refrigerant or exchanges heat between the refrigerant and outdoor air according to settings and then supplies the refrigerant to the indoor unit 31*b* by operating the compressor and the outdoor heat exchanger. The outdoor unit 21*b* may be driven by a demand from a remote controller (not shown) or the indoor unit 31*b*. Here, as a cooling/heating capacity is varied so as to correspond to operating indoor units 31*b*, the number of operating outdoor units 21*b* and the number of operating compressors installed in the outdoor unit 21*b* may be varied.

Here, the outdoor unit 21*b* supplies the compressed refrigerant to the connected indoor unit 31*b*.

The indoor unit 31*b* receives the refrigerant from the outdoor unit 21*b* and discharges cool or heated air to an indoor space. The indoor unit 31*b* may include an indoor heat exchanger (not shown), an indoor fan (not shown), an expansion valve (not shown) to expand the supplied refrigerant, and a plurality of sensors (not shown).

Here, the outdoor unit 21*b* and the indoor unit 31*b* may be connected to each other by a communication line so as to transmit/receive data to/from each other, and the outdoor unit 21*b* and the indoor unit 31*b* may be connected to the remote controller (not shown) by wire or wirelessly so as to be operated under the control of the remote controller (not shown).

The remote controller (not shown) may be connected to the indoor unit 31*b*, input a user control command to the indoor unit 31*b*, and receive and display state information of the indoor unit 31*b*. Here, the remote controller (not shown) may execute communication with the indoor unit 31*b* by wire or wirelessly according to connection types of the indoor unit 31*b*.

Figure 14:
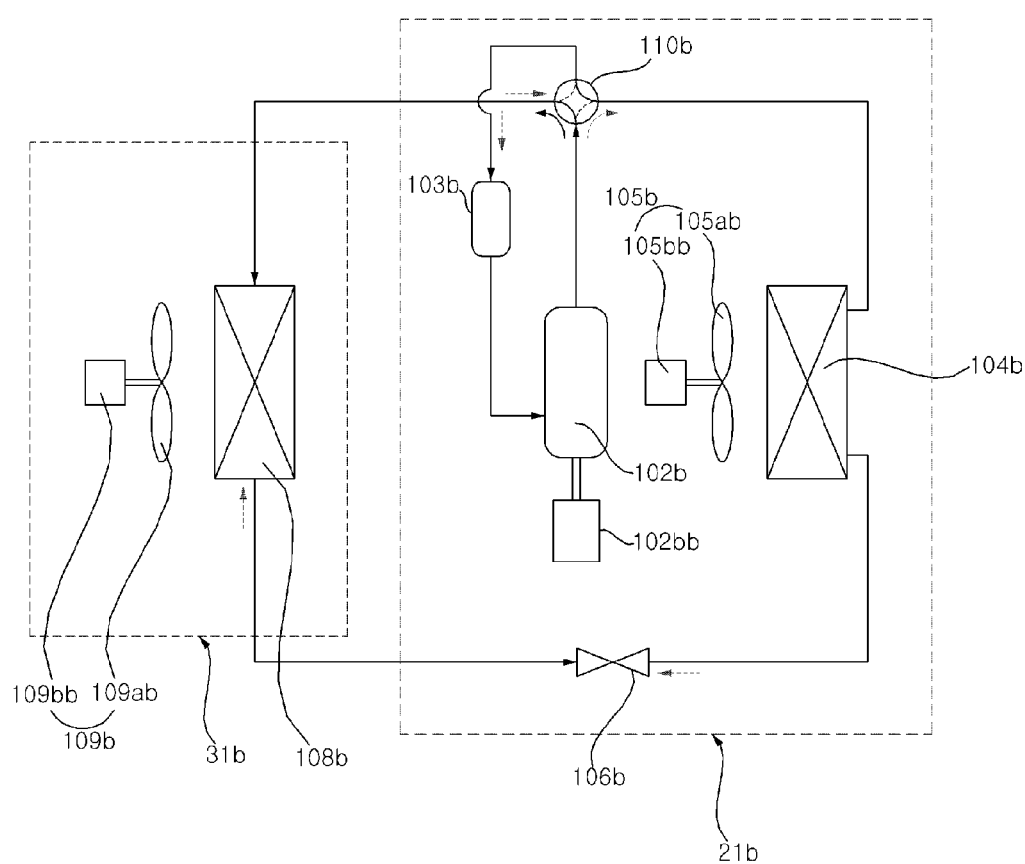
FIG. 14 is a schematic view illustrating an outdoor unit and an indoor unit of FIG. 13.

FIG. 14 is a circuit diagram of the outdoor unit and the indoor unit of FIG. 13.

With reference to FIG. 14, the air conditioner 100*b* generally includes the indoor unit 31*b* and the outdoor unit 21*b*.

The outdoor unit 21*b* includes a compressor 102*b* serving to compress a refrigerant, a compressor motor 102*bb* to drive the compressor 102*b*, an outdoor heat exchanger 104*b* serving to dissipate heat from the compressed refrigerant, an outdoor air blower 105*b* including an outdoor fan 105*ab* disposed at one side of the outdoor heat exchanger 104*b* and promoting dissipation of heat from the refrigerant and a motor 105*bb* to rotate the outdoor fan 105*ab*, an expansion unit 106*b* to expand the condensed refrigerant, a cooling/heating switching valve 110*b* to switch the flow path of the compressed refrigerant, and an accumulator 103*b* to temporarily store the refrigerant in a gaseous state, to remove moisture and foreign substances from the refrigerant and then to supply the refrigerant of a designated pressure to the compressor 102*b*.

The indoor unit 31*b* includes an indoor heat exchanger 109*b* disposed indoors and executing cooling/heating functions, and an indoor air blower 109*b* including an indoor fan 109*ab* disposed at one side of the indoor heat exchanger 109*b* and promoting dissipation of heat from the refrigerant and a motor 109*bb* to rotate the indoor fan 109*ab*.

Here, at least one indoor heat exchanger 109*b* may be installed. At least one of an inverter compressor and a constant speed compressor is used as the compressor 102*b*.

Further, the air conditioner 100*b* may be a cooler to cool an indoor space or be a heat pump to cool or heat an indoor space.

The compressor 102b in the outdoor unit 21b of FIG. 14 may be driven by a motor drive device to drive the compressor motor 250b, which is the same as the motor drive device, as exemplarily shown in FIG. 1.

Further, the indoor fan 109ab or the outdoor fan 105ab may be driven by a motor drive device to drive the indoor fan motor 109bb or the outdoor fan motor 150bb, which is the same as the motor drive device, as exemplarily shown in FIG. 1.

Figure 15:
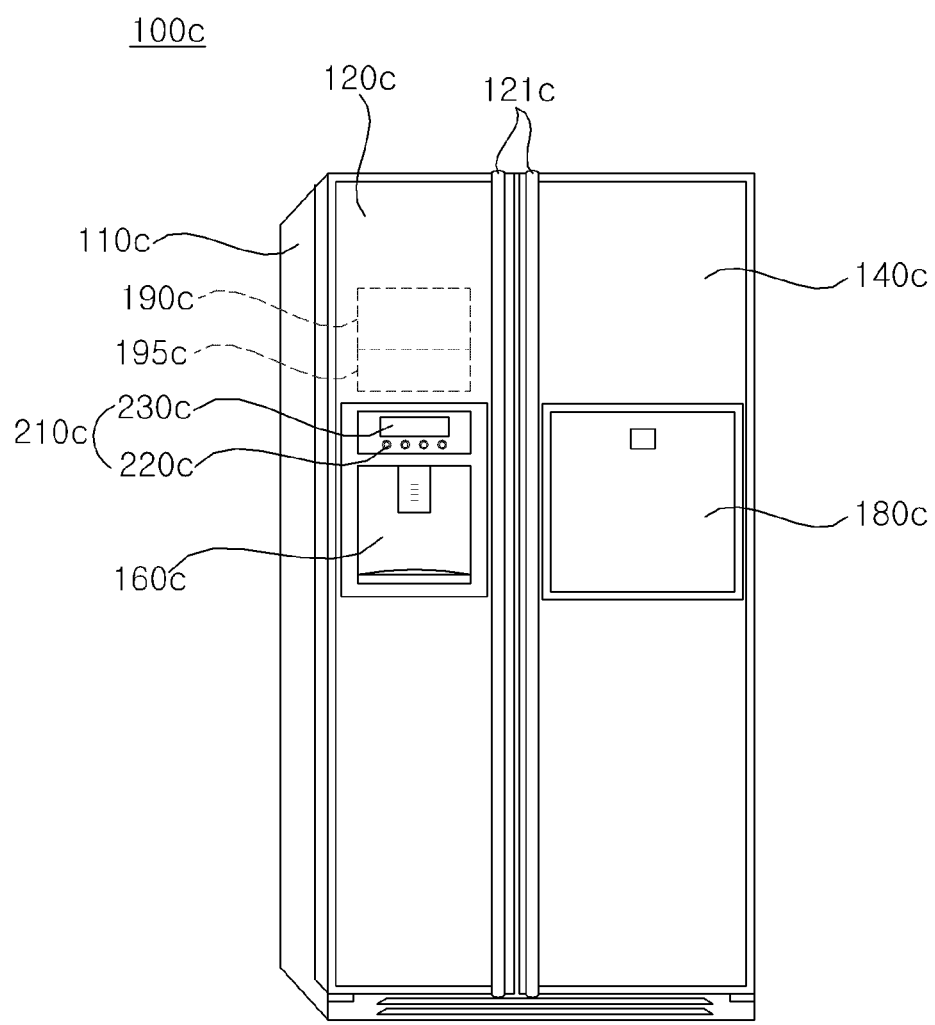
FIG. 15 is a perspective view illustrating a refrigerator as yet another example of a home appliance in accordance with one embodiment of the present invention.

FIG. 15 is a perspective view illustrating a refrigerator as yet another example of a home appliance in accordance with one embodiment of the present invention.

With reference to FIG. 15, a refrigerator 100c in accordance with this embodiment of the present invention forms an approximate external appearance by a case 110c having an inner space divided into a freezing chamber and a refrigerating chamber, a freezing chamber door 120c to open and close the freezing chamber, and a refrigerating chamber door 140c to open and close the refrigerating chamber.

Further, door handles 121c protruding forward are provided on the front surfaces of the freezing chamber door 120c and the refrigerating chamber door 140c so that a user may easily grip and rotate the freezing chamber door 120c and the refrigerating chamber door 140c.

Further, a home bar 180c allowing a user to withdraw stored goods, such as drinks received in the refrigerating chamber, without opening the refrigerating chamber door 140c may be further provided on the front surface of the refrigerating chamber door 140c.

Further, a dispenser 160c allowing a user to easily withdraw ice or drinking water without opening the freezing chamber door 120c may be further provided on the front surface of the freezing chamber door 120c, and a control panel 210c to control operation of the refrigerator 100c and to display the operating state of the refrigerator 100c through a display may be further provided above the dispenser 160c.

Although FIG. 15 illustrates the dispenser 160c as being disposed on the front surface of the freezing chamber door 120c, the disclosure is not limited thereto and the dispenser 160c may be disposed on the front surface of the refrigerating chamber door 140c.

Further, an icemaker 190c to make ice from supplied water using cool air within the freezing chamber (not shown) and an ice bank 195c to receive ice, made by the icemaker 190 and then deiced from the icemaker 190, may be provided at the upper portion of the inside of the freezing chamber. Further, although not shown in the drawings, an ice chute (not shown) to guide ice contained in the ice bank 195c so as to drop the ice to the dispenser 160c may be further provided.

The control panel 210c may include an input unit 220c including a plurality of buttons and a display 230c to display a control screen, an operating state, etc.

The display 230c displays information, such as the control screen, the operating state, the temperatures of the chambers, etc. For example, the display 230c may display the service type (ice cubes, water or crushed ice) of the dispenser 160c, the set temperature of the freezing chamber, the set temperature of the refrigerating chamber, etc.

Such a display 230c may be variously implemented as a liquid crystal display (LCD), a light emitting diode (LED), an organic light emitting diode (OLED), etc. Further, the display 230c may be implemented as a touchscreen which may also execute the function of the input unit 220c.

The input unit 220c may include a plurality of operation buttons. For example, the input unit 220c may include a dispenser setting button (not shown) to set the service type (ice cubes, water or crushed ice) of the dispenser 160c, a refrigerating chamber temperature setting button (not shown) to set the temperature of the refrigerating chamber, a freezing chamber temperature setting button (not shown) to set the temperature of the freezing chamber, etc. Further, the input unit 220c may be implemented as a touchscreen which may also execute the function of the display 230c.

The refrigerator 110c in accordance with this embodiment of the present invention is not limited to a double door type shown in FIG. 15 and may be one of various types, such as an one door type, a sliding door type and a curtain door type.

Figure 16:
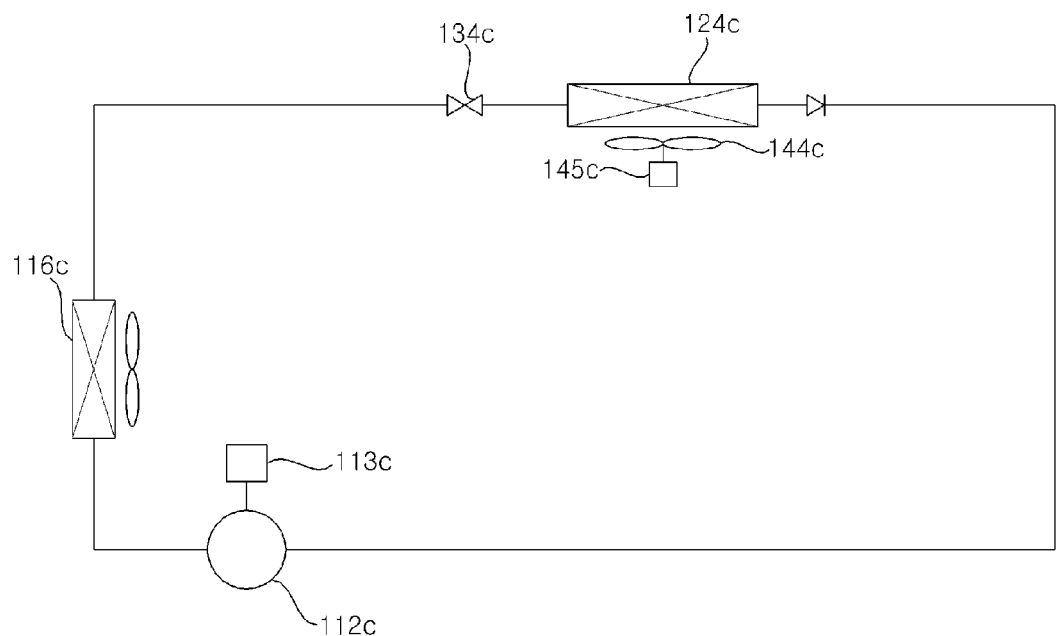
FIG. 16 is a view illustrating the configuration of the refrigerator of FIG. 15 in brief.

FIG. 16 is a view illustrating the configuration of the refrigerator of FIG. 15 in brief.

With reference to FIG. 16, the refrigerator 100c may include a compressor 112c, a condenser 116c to condense a refrigerant compressed by the compressor 112c, a freezing chamber evaporator 124c disposed in the freezing chamber (not shown) to receive and evaporate the refrigerant condensed by the condenser 116c, and a freezing chamber expansion valve 134c to expand the refrigerant supplied to the freezing chamber evaporator 124c.

Although FIG. 16 exemplarily illustrates one evaporator 124c, an evaporator in the freezing chamber and an evaporator in the refrigerating chamber may be used.

That is, the refrigerator 100c may further include a refrigerating chamber evaporator (not shown) disposed in the refrigerating chamber (not shown), a 3-way valve (not shown) to supply the refrigerant condensed by the condenser 116c to the refrigerating chamber evaporator (not shown) or the freezing chamber evaporator 124c, and a refrigerating chamber expansion valve (not shown) to expand the refrigerant supplied to the refrigerating chamber evaporator (not shown).

Further, the refrigerator 100c may further include a gas-liquid separator (not shown) to separate the refrigerant having passed through the evaporator 124c into refrigerant in a liquid state and refrigerant in a gaseous state.

Further, the refrigerator 100c may further include a refrigerating chamber fan (not shown) and a freezing chamber fan 144c to intake cool air having passed through the freezing chamber evaporator 124c and to supply the cool air respectively to the refrigerating chamber (not shown) and the freezing chamber (not shown).

Further, the refrigerator 100c may further include a compressor drive unit 113c to drive the compressor 112c, a refrigerating chamber fan drive unit (not shown) to drive the refrigerating chamber fan (not shown) and a freezing chamber fan drive unit 145c to drive the freezing chamber fan 144c.

FIG. 16 illustrates the common evaporator 124c as being used for both the refrigerating chamber and the freezing chamber and, in this case, a damper (not shown) may be installed between the refrigerating chamber and the freezing chamber and a fan (not shown) may forcibly blow cool air generated by one evaporator 124c so as to supply the cool air to the freezing chamber and the refrigerating chamber.

The compressor 112c of FIG. 16 may be driven by a motor drive device to drive a compressor motor, which is the same as the motor drive device, as exemplarily shown in FIG. 1.

Further, the refrigerating chamber fan or the freezing chamber fan 144c may be driven by a motor drive device to drive the refrigerating chamber fan or the freezing chamber fan 144c, which is the same as the motor drive device, as exemplarily shown in FIG. 1.

A mobile terminal and a home appliance in accordance with one embodiment of the present invention are not limited to the configurations and methods of the above-described embodiments, but all or parts of the respective embodiments may be selectively combined so that various modifications of the embodiments are possible and contemplated by the claims.

Further, a method for driving a motor or a method for operating a home appliance in accordance with embodiments of the present invention may be implemented as code readable and executed by a processor provided in a motor drive device or the home appliance in a recording medium readable by the processor. The recording medium readable by the processor may be any kind of recording device in which data readable by the processor are stored.

As apparent from the above description, a mobile terminal in accordance with one embodiment of the present invention includes a communication unit, a microphone, a display, and a controller to transmit a remote control signal for transmitting diagnostic data to a home appliance through the communication unit, to extract diagnostic data of the home appliance from sound received from the home appliance through the microphone, and to transmit a diagnostic data image, acquired by imaging the diagnostic data, to a server, and may thus conveniently transmit the diagnostic data image based on the diagnostic data of the home appliance to the server.

Particularly, the diagnostic data image further include product information of the home appliance, installation place information, and installation or diagnostic service provider information, in addition to the diagnostic data, and the diagnostic data image together with the information regarding a service provider may be conveniently transmitted to the server.

Further, by displaying a diagnostic data picture based on the diagnostic data, user convenience may be increased.

A home appliance in accordance with one embodiment of the present invention includes a memory to store diagnostic data, a communication unit to exchange data with a mobile terminal, a sound output unit, and a controller, in response to reception of a diagnostic data request through the communication unit, to control the sound output unit to output sound corresponding to the diagnostic data, and may thus conveniently output the diagnostic data of the home appliance to the outside.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A home appliance comprising:
a memory to store diagnostic data;
a communication unit to exchange data with a mobile terminal;
a sound output unit;
an inverter comprising a plurality of switching elements, converting DC power into AC power by switching of the switching elements and supplying the AC power to a motor, wherein the AC power includes a phase power, b phase power, and c phase power; and
a controller to control the communication unit and the sound output unit, in response to reception of a diagnostic data request through the communication unit, to control the sound output unit to output sound corresponding to the diagnostic data stored in the memory,
wherein the controller is configured to:
increase the volume of the output sound, lower the frequency of the output sound, or increase the output period of the output sound, as the distance from the home appliance to the mobile terminal increases,
increase difference among an a-phase turn-on duty, a b-phase turn-on duty and a c-phase turn-on duty for increasing the volume of first sound or second sound.

2. The home appliance according to claim 1, wherein the controller controls sound having a data amount to be outputted varying according to a distance from the home appliance to the mobile terminal.

3. The home appliance according to claim 1, wherein the communication unit receives an IR signal-based diagnostic data request.

4. The home appliance according to claim 1, wherein:
the sound output unit includes the inverter, converting DC power into AC power by switching of the switching elements and supplying the AC power to a motor; and
the controller varies a switching frequency of each switching element of the inverter and controls sound corresponding to the varied switching frequency to be outputted.

5. The home appliance according to claim 4, wherein the controller varies a level or a frequency of current flowing in the motor so as to vary a volume or a frequency of the sound.

6. The home appliance according to claim 1, wherein the sound output unit includes:
a frequency transformer to transform a frequency of sound to be outputted;
a data embedding unit to embed the diagnostic data in an audio signal of the transformed frequency;
an inverse transformer to execute inverse transformation of the audio signal with the diagnostic data; and
a multiplexer to multiplex the inversely transformed audio signal,
wherein the sound output unit outputs sound corresponding to the multiplexed audio signal.

* * * * *